(12) United States Patent
Miwa

(10) Patent No.: US 10,896,057 B2
(45) Date of Patent: Jan. 19, 2021

(54) JOB ASSIGNMENT APPARATUS, JOB ASSIGNMENT METHOD, AND NETWORK SYSTEM

(71) Applicant: FUJITSU LIMITED, Kawasaki (JP)

(72) Inventor: Masahiro Miwa, Kawaguchi (JP)

(73) Assignee: FUJITSU LIMITED, Kawasaki (JP)

( * ) Notice: Subject to any disclaimer, the term of this patent is extended or adjusted under 35 U.S.C. 154(b) by 276 days.

(21) Appl. No.: 16/029,140

(22) Filed: Jul. 6, 2018

(65) Prior Publication Data

US 2019/0018704 A1 Jan. 17, 2019

(30) Foreign Application Priority Data

Jul. 12, 2017 (JP) .................................. 2017-136498

(51) Int. Cl.
| | |
|---|---|
| *G06F 9/48* | (2006.01) |
| *G06F 9/50* | (2006.01) |
| *H04L 12/933* | (2013.01) |
| *H04L 12/24* | (2006.01) |
| *H04L 5/14* | (2006.01) |

(52) U.S. Cl.
CPC .......... *G06F 9/4843* (2013.01); *G06F 9/5027* (2013.01); *H04L 5/14* (2013.01); *H04L 41/12* (2013.01); *H04L 49/102* (2013.01)

(58) Field of Classification Search
CPC ....... G06F 9/4843; G06F 9/5027; H04L 5/14; H04L 41/12; H04L 49/102
See application file for complete search history.

(56) References Cited

U.S. PATENT DOCUMENTS

| | | | |
|---|---|---|---|
| 2012/0317321 A1* | 12/2012 | Chang ................... | G06F 1/3293 710/107 |
| 2014/0376561 A1 | 12/2014 | Armbruster et al. | |
| 2015/0256451 A1* | 9/2015 | Nakashima ............. | H04L 45/48 370/389 |

FOREIGN PATENT DOCUMENTS

JP          2014-533449          12/2014

OTHER PUBLICATIONS

Ajima et al. Tofu: A 6D Mesh/Torus Interconnect for Exascale Computers. [online] IEEE., pp. 36-40. Retrieved From the Internet <https://ieeexplore.ieee.org/stamp/stamp.jsp?arnumber=5331902> (Year: 2009).*

(Continued)

*Primary Examiner* — Emerson C Puente
*Assistant Examiner* — Jonathan R Labud
(74) *Attorney, Agent, or Firm* — Fujitsu Patent Center

(57) ABSTRACT

A job assignment apparatus includes a processor configured to perform assignment of a first job to a first arithmetic device and a second arithmetic device in such a way that data is transmitted in a first direction, the first job being processed in a process algorithm in which a plurality of arithmetic devices sequentially transmit data, the first arithmetic device being connected to the second arithmetic device via a first switch and a second switch, the first direction being a direction from the first switch to the second switch, and perform assignment of a second job to a third arithmetic device and a fourth arithmetic device in such a way that data is transmitted in a second direction, the third arithmetic device being connected to the fourth arithmetic device via the first switch and the second switch, the second direction being a different direction from the first direction.

14 Claims, 21 Drawing Sheets

(56) References Cited

OTHER PUBLICATIONS

Nathan Luehr, "Fast Multi-GPU collectives with NCCL", NVIDIA Developer, Apr. 7, 2016 (6 pages).

\* cited by examiner

FIG. 5

| SWITCH NUMBER | GLOBAL NUMBER | LOCAL NUMBER | FIRST JOB | SECOND JOB | ASSIGNMENT UNACCEPTABLE FLAG |
|---|---|---|---|---|---|
| SW0 | #0 | ##0 | JOB A | | |
|     | #1 | ##1 |       | JOB B | 1 |
| SW1 | #2 | ##0 | JOB A | | |
|     | #3 | ##1 |       | JOB B | 1 |
| SW2 | #4 | ##0 | JOB A | | |
|     | #5 | ##1 |       | JOB B | 1 |

| SWITCH NUMBER | GLOBAL NUMBER | LOCAL NUMBER | FIRST JOB | SECOND JOB | ASSIGNMENT UNACCEPTABLE FLAG |
|---|---|---|---|---|---|
| SW0 | #0 | ##0 | | | 0 |
| | #1 | ##1 | | | |
| SW1 | #2 | ##0 | JOB A | | 1 |
| | #3 | ##1 | | JOB B | |
| SW2 | #4 | ##0 | JOB A | | 1 |
| | #5 | ##1 | | JOB B | |
| SW3 | #6 | ##0 | JOB A | | 1 |
| | #7 | ##1 | | JOB B | |
| SW4 | #8 | ##0 | JOB A | | 0 |
| | #9 | ##1 | | | |

…

JOB ASSIGNMENT APPARATUS, JOB ASSIGNMENT METHOD, AND NETWORK SYSTEM

CROSS-REFERENCE TO RELATED APPLICATION

This application is based upon and claims the benefit of priority of the prior Japanese Patent Application No. 2017-136498, filed on Jul. 12, 2017, the entire contents of which are incorporated herein by reference.

FIELD

The embodiments discussed herein are related to job assignment technology.

BACKGROUND

Supercomputers or personal computer (PC) cluster systems include many servers, sometimes called nodes, interconnected via a high-speed network. The arrangement of interconnecting these servers via the network is referred to as the "network topology". Various types of network topologies, including fat tree topology and full mesh topology, are applicable to such supercomputers and PC cluster systems.

The fat tree topology refers to a network topology in which servers interconnected with multiplex upstream connecting links are arranged in a tree shape. The full mesh topology refers to a network topology in which switches connected between servers are interconnected directly, namely, without any other switches therebetween.

The full mesh topology makes it possible to connect a larger number of servers to each other by using a certain number of switches in comparison with the fat tree topology. Furthermore, the full mesh topology interconnects servers with a shorter route with a smaller number of communication hops therebetween.

However, the network employing the fat tree topology enables servers to communicate with each other via a larger number of communication paths than the network employing the full mesh topology.

One related network communication technique is a network system having ring-shaped communication paths. Japanese National Publication of International Patent Application No. 2014-533449 discloses an example of this technique.

SUMMARY

According to an aspect of the invention, a job assignment apparatus includes a processor configured to perform assignment of a first job to a first arithmetic device and a second arithmetic device in such a way that data is transmitted in a first direction, the first job being processed in a process algorithm in which a plurality of arithmetic devices sequentially transmit data, the first arithmetic device being connected to the second arithmetic device via a first switch and a second switch, the first direction being a direction from the first switch to the second switch, and perform assignment of a second job to a third arithmetic device and a fourth arithmetic device in such a way that data is transmitted in a second direction, the third arithmetic device being connected to the fourth arithmetic device via the first switch and the second switch, the second direction being a direction from the second switch to the first switch.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of the assignment management table;

FIG. 8 illustrates another example of the assignment management table;

DESCRIPTION OF EMBODIMENTS

When a plurality of servers communicate with one another over a network in accordance with an assigned job, their communications may conflict. If the network employs the fat tree topology, the servers are able to conduct the communications via different communication paths, thereby reducing the risk of occurrences of conflicts. If the network employs the full mesh topology, however, the servers may conduct communications via the same communication path and in the same direction. As a result, a conflicting link might be generated to lower a communication performance of the network.

To suppress such conflicting links from being generated, a method of assigning a job to only servers except servers connected directly to a switch connected directly to a server to which a job has been assigned is conceivable. In this case, some servers are left unused although these servers are able to accept a job. This situation might result in lowered usage efficiency of an overall system. In addition, if the full mesh topology network uses a simple ring-shaped communication path, it may be difficult to suppress conflicting links from being generated.

With reference to the accompanying drawings, a description will be given below in detail of a job assignment apparatus, method, and program in some embodiments. It is to be noted that this description is not intended for limitation purposes.

Embodiment 1

Figure 1:
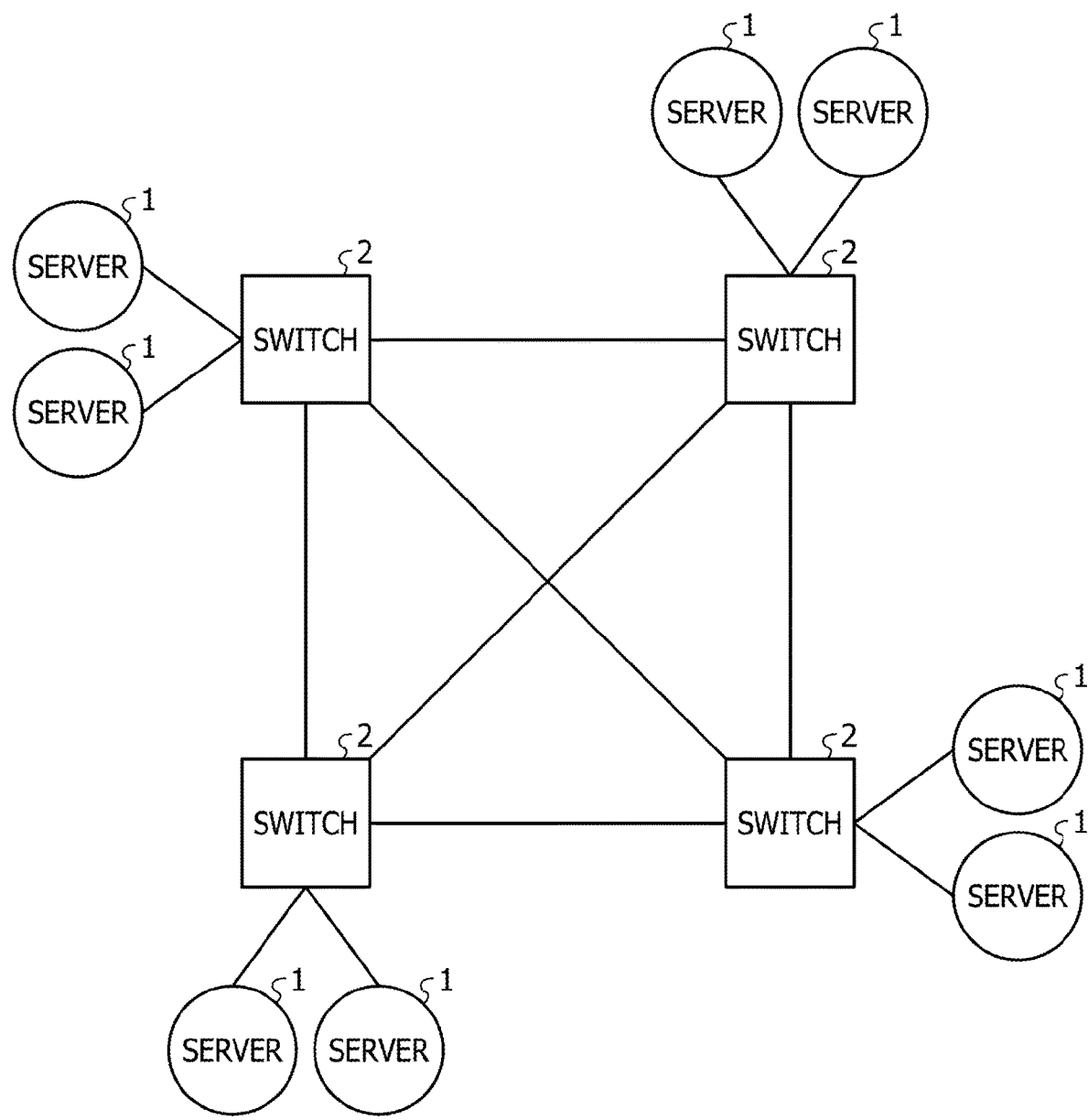
FIG. 1 schematically illustrates an example of a network configuration employing the full mesh topology.

FIG. 1 schematically illustrates an example of a network configuration employing the full mesh topology in Embodiment 1. As illustrated in FIG. 1, the network employing the full mesh topology includes a plurality of servers 1 and switches 2. The switches 2 are all interconnected directly via full duplex communication lines and each connected to a plurality of servers 1. Although four switches 2 are disposed on the network in FIG. 1, three or five or more switches 2 may be disposed.

The servers 1 are able to communicate with one another via one or more corresponding switches 2. Although two servers 1 are connected to each switch 2 in FIG. 1, any number of servers 1 may be connected to each switch 2. In addition, for example, different numbers of servers 1 may be connected to different switches 2.

Figure 2:
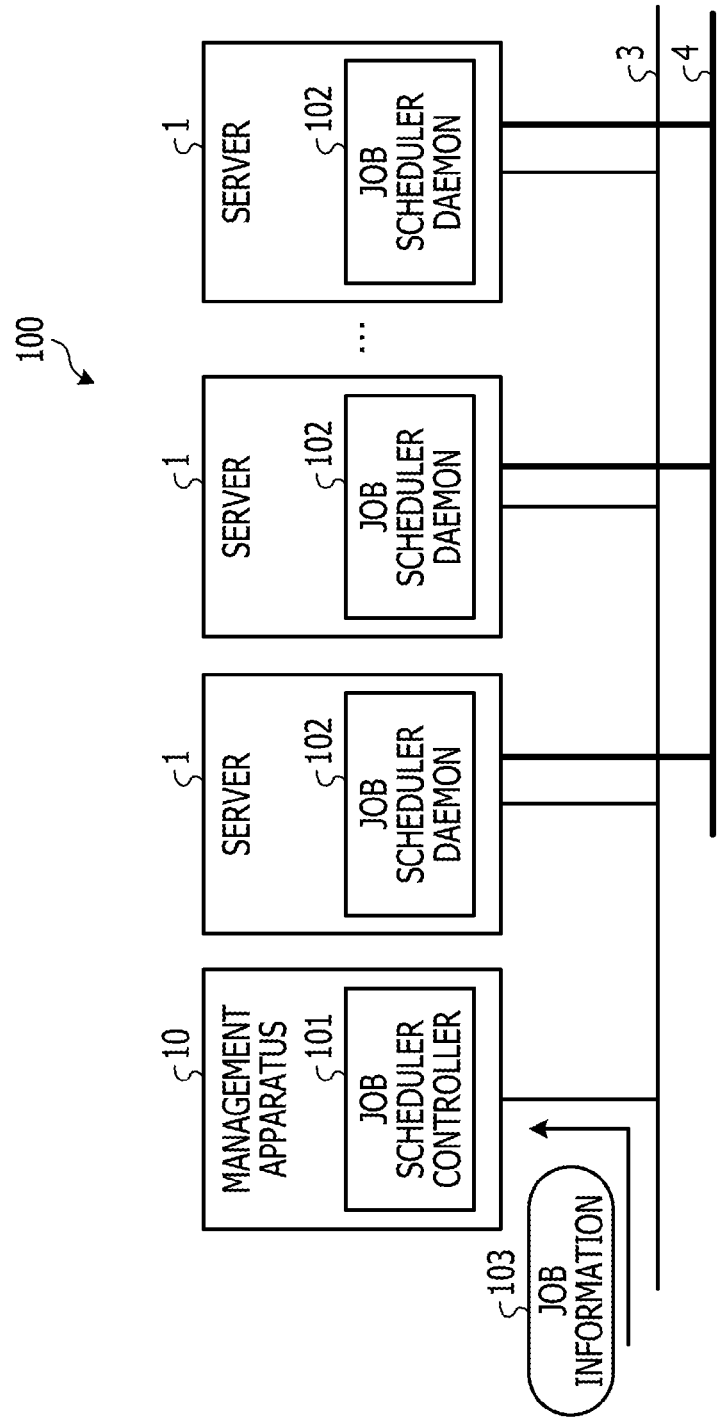
FIG. 2 schematically illustrates the entry of a job.

With reference to FIG. 2, a description will be given below of an information processing system 100 including a management apparatus 10 that manages the above servers 1. FIG. 2 schematically illustrates the entry of a job. In FIG. 2, the servers 1 are interconnected directly via both a management network 3 and a calculation network 4. Alternatively, the servers 1 may be interconnected with any relay device therebetween. In fact, for example, the calculation network 4 corresponds to the network employing the full mesh topology illustrated in FIG. 1; the servers 1 are interconnected via one or more corresponding switches 2.

Each of the servers 1 and the management apparatus 10 includes a central processing unit (CPU) and a memory. Each server 1 may also be referred to as the calculation node; the management apparatus 10 may also be referred to as the management node.

For example, the management apparatus 10 includes a job scheduler controller 101; each server 1 includes a job scheduler daemon 102. The job scheduler controller 101 receives job information 103 from an operator. The job information 103 may contain: a path of a program for use in executing a job; a parallel number that indicates the number of servers 1 used at the same time by the program; and an execution time for the grogram, for example. After having received the job information 103, the job scheduler controller 101 selects servers 1 to execute the job, based on the parallel number and other information. Then, the job scheduler controller 101 instructs the job scheduler daemons 102 in the selected servers 1 to execute the job over the management network 3. The process in which the job scheduler controller 101 selects the servers 1 and instructs the selected servers 1 to execute the job corresponds to a job assignment.

In this embodiment, the management apparatus 10 causes the servers 1 to execute a job that involves a collective communication operation using a ring algorithm. The ring algorithm is used to perform a process by transmitting data in circular form. The collective communication operation, also referred to as the "group communication operation", is communication through which one or more servers 1 transmit data and one or more other servers 1 receive the data. Details of the job assignment performed by the management apparatus 10 will be described later. In this embodiment to be described below, the management apparatus 10 is expected to cause three or more servers 1 to execute the job.

The job scheduler daemons 102, which operate in the respective servers 1, receive an instruction for executing a job from the job scheduler controller 101, which operates in the management apparatus 10. Then, the job scheduler daemons 102 cause the respective servers 1 to execute the received job. The servers 1 execute the job by communicating with one another over the calculation network 4. Each server 1 may be connected to an independent storage unit and read a program to be executed and data to be used from the storage unit when executing the job. Alternatively, all the servers 1 may be connected to a single file server, and read a program to be executed and data to be used from the file server when executing the job. Each server 1 corresponds to an example of the "arithmetic device".

In this embodiment, the job scheduler controller 101 is provided in the management apparatus 10 independent of the servers 1 that execute the job. However, the job scheduler controller 101 may be provided in any of the servers 1.

Figure 3:
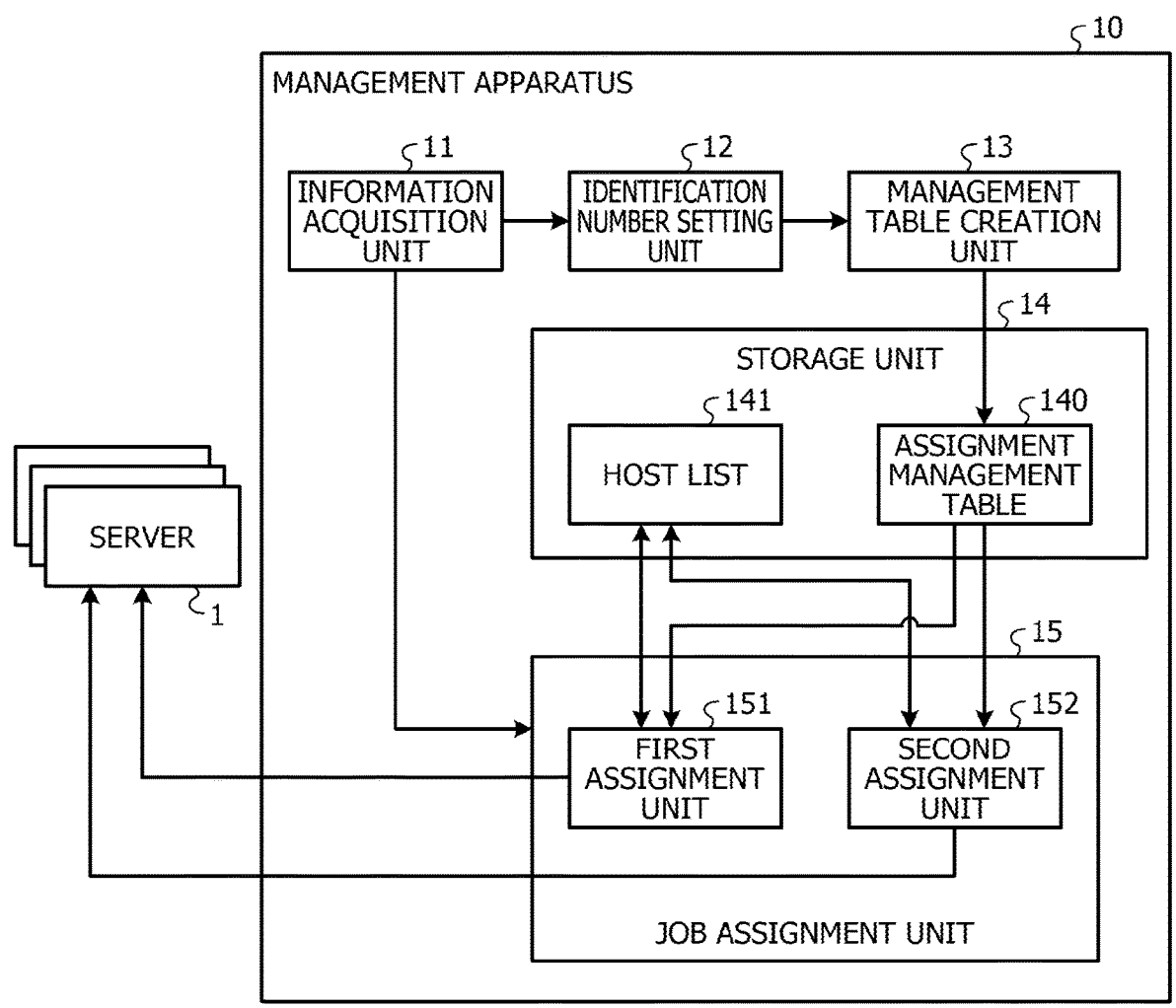
FIG. 3 is a block diagram of the management apparatus in Embodiment 1.

With reference to FIG. 3, a description will be given below of the job assignment performed by the management apparatus 10. FIG. 3 is a block diagram of the management apparatus 10 according to Embodiment 1. As illustrated in FIG. 3, the management apparatus 10 includes an information acquisition unit 11, an identification number setting unit 12, a management table creation unit 13, a storage unit 14, and a job assignment unit 15.

The storage unit 14 may be a storage device such as a memory. The storage unit 14 includes an assignment management table 140 and a host list 141; the assignment management table 140 contains the assignment of jobs to the servers 1, and the host list 141 contains a sequence in which the servers 1 are to be used by the jobs.

The information acquisition unit 11 acquires network configuration information, which is information regarding available switches 2 in the information processing system 100 and servers 1 connected to each switch 2. For example, the information acquisition unit 11 may acquire the network configuration information from an operator through an input to an input device, such as a keyboard, provided in the management apparatus 10. After having acquired the network configuration information, the information acquisition unit 11 outputs this network configuration information to the identification number setting unit 12.

Figure 4:
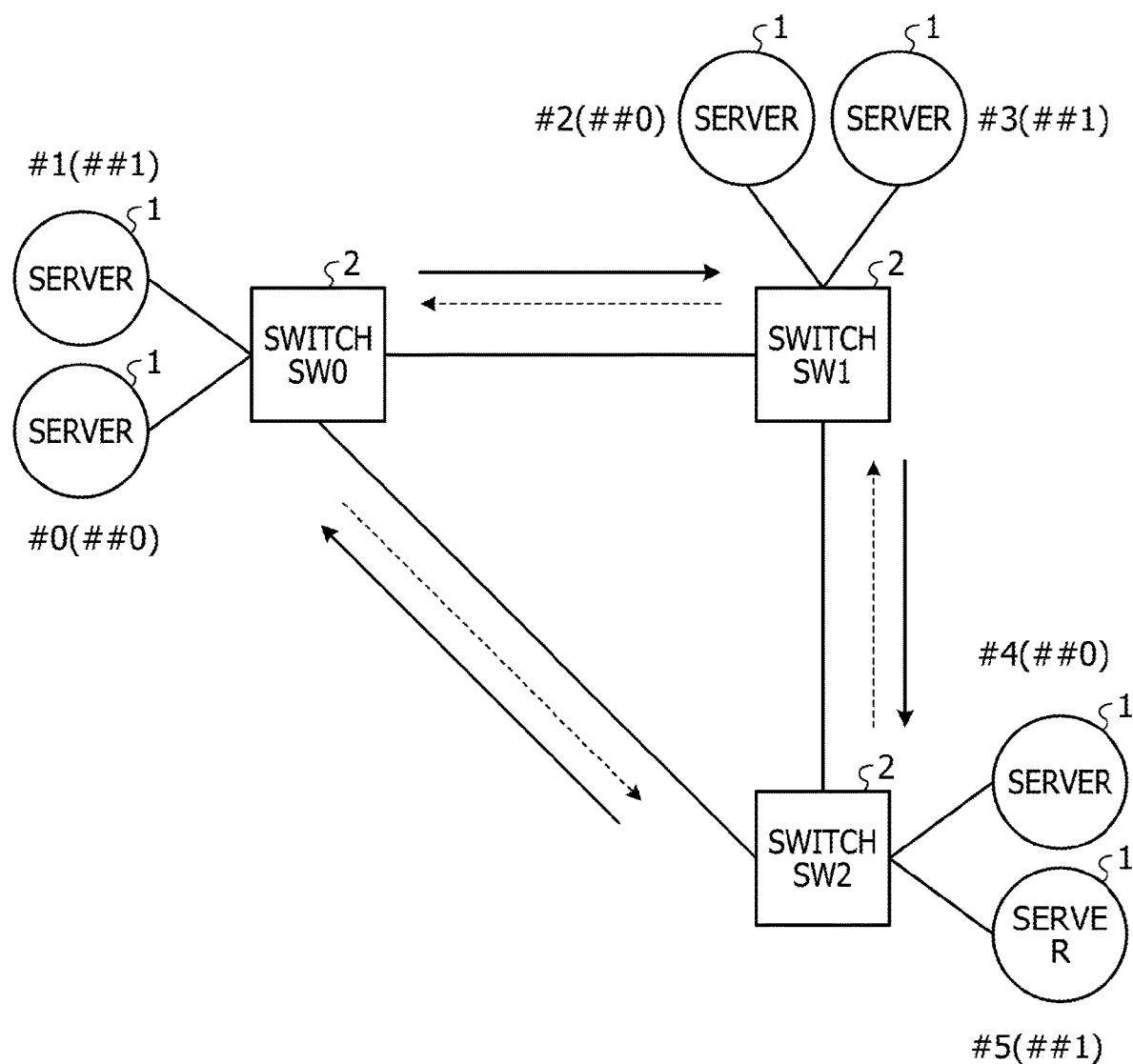
FIG. 4 schematically illustrates an example of the network configuration in which jobs are assigned to servers.

In this embodiment, for example, the information acquisition unit 11 may receive the network configuration information on a network illustrated in FIG. 4. More specifically, the information acquisition unit 11 acquires the network configuration information on the network employing the full mesh topology on which three switches 2 are interconnected and each switch 2 is connected to two servers 1. Hereinafter, the three switches 2 are also detonated by SW0 to SW2, as illustrated in FIG. 4.

In addition to the above network configuration information, the information acquisition unit 11 also receives job information and then outputs the received job information to the job assignment unit 15.

The identification number setting unit 12 receives, from the information acquisition unit 11, the information regarding the available switches 2 in the information processing system 100 and the servers 1 connected to each switch 2. Then, the identification number setting unit 12 allocates local numbers to the servers 1 connected to each switch 2. The local numbers are used to differentiate between the servers 1 connected to the same switch 2. In this embodiment, the identification number setting unit 12 allocates local numbers "##0" and "##1" to two of the servers 1 connected to each switch 2. In this case, the identification number setting unit 12 may allocate any given local numbers to the servers 1 connected to the same switch 2, because these servers 1 have substantially the same function.

After having allocated the local numbers, the identification number setting unit 12, in turn, allocates global numbers to all the servers 1. More specifically, the identification number setting unit 12 uniquely allocates the global numbers so that each of the global numbers allocated to the servers 1 connected to one switch 2 is either larger than the maximum of the global numbers allocated to the servers 1 connected to any other switch 2 or smaller than the minimum of those global numbers. In other words, the identification number setting unit 12 allocates the global numbers in such a way that each of the global numbers of the servers 1 connected to one switch 2 falls outside the range between the minimum and maximum of the global numbers connected to any other switch 2.

In this embodiment, the identification number setting unit 12 allocates the global numbers to the servers 1 in such a way that the global numbers of the servers 1 connected to each of the switches 2 become sequential and in such a way that the global numbers of all the servers 1 become sequential. More concretely, of the servers 1 connected to the switch SW0, the server 1 with a smaller local number is given the global number "#0", and the other server 1 is given the global number "#1". Likewise, of the servers 1 connected to the switch SW1, the server 1 with a smaller local number is given the global number "#2", and the other server 1 is given the global number "#3". Of the servers 1 connected to the switch SW2, the server 1 with a smaller local number is given the global number "#4", and the other server 1 is given the global number "#5".

In the above way, the identification number setting unit 12 allocates both the local and global numbers to each server 1, as illustrated in FIG. 4. In FIG. 4, the characters inside the parentheses described near the respective servers 1 each represent the local number; the characters on the left sides of the respective local numbers each represent the global number.

After having allocated the local and global numbers to the servers 1, the identification number setting unit 12 outputs the local and global numbers to the management table creation unit 13 together with the network configuration information.

The management table creation unit 13 receives, from the identification number setting unit 12, the network configuration information and the local and global numbers allocated to the servers 1. Then, the management table creation unit 13 registers the global and local numbers in the assignment management table 140 stored in the storage unit 14, as illustrated in FIG. 5. FIG. 5 illustrates an example of the assignment management table 140. In FIG. 4, the rows corresponding to the "switch SW0" are related to the servers 1 connected to the switch SW0; the rows corresponding to the "switch SW1" are related to the servers 1 connected to the switch SW1; and the rows corresponding to the "switch SW2" are related to the servers 1 connected to the switch SW2.

In registering the global and local numbers in the assignment management table 140, the management table creation unit 13 registers "##0" and "##1" as the local numbers of the servers 1 connected to each of the switches SW0 to SW2. Then, the management table creation unit 13 registers "#0" as the global number of the server 1 that is connected to the switch SW0 and has the local number "##0". Likewise, the management table creation unit 13 registers "#1" as the global number of the server 1 that is connected to the switch SW0 and has the local number "##1". The management table creation unit 13 registers "#2" as the global number of the server 1 that is connected to the switch SW1 and has the local number "##0". The management table creation unit 13 registers "#3" as the global number of the server 1 that is connected to the switch SW1 and has the local number "##1". The management table creation unit 13 registers "#4" as the global number of the server 1 that is connected to the switch SW2 and has the local number "##0". The management table creation unit 13 registers "#5" as the global number of the server 1 that is connected to the switch SW2 and has the local number "##1". Those global numbers correspond to an example of the "identification numbers".

The job assignment unit 15 receives the job information from the information acquisition unit 11. In this embodiment, the job information received by the job assignment unit 15 contains two jobs, each of which instructs three servers 1 to perform the collective communication operation using the ring algorithm. Hereinafter, one of the jobs is referred to as the "job A", whereas the other is referred to as the "job B".

The job assignment unit 15 individually operates two functional units in relation to the jobs A and B. More specifically, the job assignment unit 15 operates a first assignment unit 151 in relation to the job A and a second assignment unit 152 in relation to the job B. Since the servers 1 execute the two jobs in this embodiment, the job assignment unit 15 is provided with the first assignment unit 151 and the second assignment unit 152. If the servers 1 execute three or more jobs, the job assignment unit 15 may be provided with many more units having the similar function in accordance with the number of jobs to be executed. For the convenience of the explanation, the job assignment unit 15 is provided with the first assignment unit 151 and the second assignment unit 152 in relation to the jobs A and B, respectively, in this embodiment. However, the first assignment unit 151 and the second assignment unit 152 that have similar functions may be realized by a single functional unit that individually assigns the jobs.

The first assignment unit 151 acquires the job information on the job A. Then, the first assignment unit 151 determines whether the job A involves a collective communication operation for which the ring algorithm is usable. For example, the first assignment unit 151 may acquire message passing interface (MPI) function name information from a program used to execute the job A. To acquire the MPI function name information, the first assignment unit 151 may acquire a symbol table using an nm command in Linux (trademark). Then, the first assignment unit 151 determines whether the acquired MPI function name information indicates a collective communication operation using the ring algorithm. To make this determination, the first assignment unit 151 determines whether the MPI function name information contains MPI Allgather (v), MPI Allreduce, or MPI Bcast.

MPI Allgather (v) represents communication through which each process collects data from any other processes. MPI Allreduce represents communication through which the result of calculating the collected data is transmitted to all the processes. MPI Bcast represents communication through which data in one process is transmitted to all the other processes. If the MPI function name information acquired in the above manner indicates the collective communication operation using the ring algorithm, the first assignment unit 151 may determine that the ring algorithm is usable for the job A. The word "process" discussed herein represents an execution unit of a job, more specifically, a processing function for a job to be executed by each server 1.

After having determined that the ring algorithm is usable for the job A, the first assignment unit 151 selects, from among the switches 2 with the switch numbers listed in the assignment management table 140, switches 2 with their assignment unacceptable flags each set to a value indicating that a job is unacceptable. Then, first assignment unit 151 designates the selected switches 2 to be used. In the assignment management table 140, if the assignment unacceptable flag of a switch 2 is set to "1", the servers 1 connected to this switch 2 are unable to accept a job, whereas if the assignment unacceptable flag of a switch 2 is set to "0", the servers 1 connected to this switch 2 are able to accept a job. In the assignment management table 140, the value of the assignment unacceptable flag is initially set to "0".

In this embodiment, the first assignment unit 151 selects the switches SW0 to SW2 to execute the job A. Then, the first assignment unit 151 refers to the assignment management table 140 and checks whether other jobs have already been assigned to the servers 1 connected to any of the switches SW0 to SW2. In this case, the first assignment unit 151 confirms that no jobs are assigned to all the servers 1 connected to the switches SW0 to SW2.

After having confirmed that no jobs are assigned to all the servers 1, the first assignment unit 151 selects an arbitrary one from the switches SW0 to SW2 and further selects one of the servers 1 connected to the selected switch 2. Then, the first assignment unit 151 registers "job A" in the column "first job" for the selected server 1 in the assignment management table 140. This means that the server 1 for which the job A is registered in the column "first job" will execute the first job, namely, the job A. Likewise, the first assignment unit 151 selects one of the unselected switches 2 and further selects one of the servers 1 connected to the selected switch 2. Then, the first assignment unit 151 registers "job A" in the column "first job" for the selected server 1 in the assignment management table 140. After that, the first assignment unit 151 selects one of the servers 1 connected to the remaining switch 2. Then, the first assignment unit 151 registers "job A" in the column "first job" for the selected server 1 in the assignment management table 140. For example, the first assignment unit 151 may determine that the servers 1 whose global numbers are "#0", "#2", and "#4" and which are connected to the switches SW0, SW1, and SW2 will execute the job A. The servers 1 selected by the first assignment unit 151 each correspond to an example of a "first arithmetic device".

Next, the first assignment unit 151 determines a sequence in which the selected servers 1 are to be used by the job A. In this case, the first assignment unit 151 sets the selected servers 1 so as to be used in ascending order of global number. More specifically, the first assignment unit 151 allocates process sequence numbers for the job A, referred to as the "rank numbers", to the individual processes. Thus, the servers 1 execute the job A by performing the processes in accordance with the rank numbers. In this case, the first assignment unit 151 allocates the rank numbers to the respective servers 1 in such a way that a smaller rank number is given to a server 1 with a smaller global number, thereby determining the sequence in which the servers 1 are to be used by the job A. Since the servers 1 with the global numbers "#0", "#2", and "#4" execute the job A in this embodiment, the first assignment unit 151 determines the sequence so that the servers 1 with the global numbers "#0", "#2", and "#4" are to be used by the job A in this order.

Figure 6:
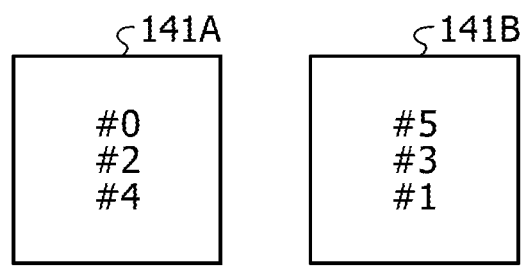
FIG. 6 illustrates an example of host lists.

After having determined the above sequence, the first assignment unit 151 creates a host list 141 that indicates the global numbers of the servers 1 that perform the processes in accordance with their rank numbers, and stores the host list 141 in the storage unit 14. For example, the first assignment unit 151 may create a host list 141A as illustrated in FIG. 6. FIG. 6 illustrates an example of the host list 141. In the host list 141A, the rank number increases downward.

After having created and stored the host list 141, the first assignment unit 151 instructs the servers 1 with the global numbers "#0", "#2", and "#4 to execute the job A so that these servers 1 perform the collective communication operation using the ring algorithm in accordance with the content of the host list 141A. In this way, the first assignment unit 151 assigns the job A to the servers 1 with the global numbers "#0", "#2", and "#4" so that the processes proceed in the direction of the solid line arrows illustrated in FIG. 4.

After the servers 1 have completely executed the job A, the first assignment unit 151 deletes the information on the job A from the assignment management table 140. In addition, the first assignment unit 151 changes the assignment unacceptable flags of the switches 2 connected to the servers 1 that have executed the job A from "1" to "0". In short, the first assignment unit 151 sets the assignment unacceptable flag of the switches SW0 to SW2 to "0".

In this embodiment, the ring algorithm is usable for the first job, namely, the job A; however, there are cases where the ring algorithm is unusable for the job A. If the ring algorithm is unusable for the job A, the processes may proceed in multiple directions. In this case, the job A may share a data path with another job, thereby generating a conflicting link. To avert this disadvantage, if the ring algorithm is unusable for the job A, the first assignment unit 151 sets the assignment unacceptable flags of all the switches 2 that are connected to the servers 1 and have executed the job A to "1". This makes it possible to block a switch 2 from being used for the job A and another job, thereby reducing the risk of generation of a conflicting link.

Returning to FIG. 3, the description will be continued. The second assignment unit 152 acquires job information on the job B. Then, the second assignment unit 152 determines whether the job B involves a collective communication operation for which the ring algorithm is usable, in a manner similar to that in which the first assignment unit 151 does.

After having determined that the ring algorithm is usable for the job B, the second assignment unit 152 selects, from among the switches 2 with the switch numbers listed in the assignment management table 140, switches 2 with their assignment unacceptable flags set to "0". Then, the second assignment unit 152 designates the selected switch 2 to be used. In this embodiment, the second assignment unit 152 selects the switches SW0 to SW2 to execute the job B. Then, the second assignment unit 152 refers to the assignment management table 140 and checks whether other jobs have already been assigned to the servers 1 connected to any of the selected switches SW0 to SW2. In this case, the second assignment unit 152 confirms that the job A has already been assigned to the servers 1 connected to any of the switches SW0 to SW2.

After having confirmed that the job A has been assigned to all the selected servers 1, the second assignment unit 152 arbitrarily selects the switch SW0 and further selects, from among the servers 1 connected to the selected switch SW0, one to which the job A is not assigned. Then, the second assignment unit 152 registers "job B" in the column "second job" for the selected server 1 in the assignment management table 140. In addition, the second assignment unit 152 sets the assignment unacceptable flag of the switch SW0 to "1", which indicates that the switch SW0 is no longer able to accept a job. Likewise, the second assignment unit 152 selects one of the unselected switches 2 and further selects one of the servers 1 connected to the selected switch 2 to which no jobs are assigned. Then, the second assignment unit 152 registers "job B" in the column "second job" for the selected server 1 in the assignment management table 140. After that, the second assignment unit 152 selects, from the servers 1 connected to the remaining switch 2, one to which no jobs are assigned. Then, the second assignment unit 152 registers "job B" in the column "second job" for the selected server 1 in the assignment management table 140. For example, the second assignment unit 152 may determine that the servers 1 with the global numbers "#1", "#3", and "#5" which are connected to the switches SW0, SW1, and SW2, respectively, will execute the job B. The servers 1 selected by the second assignment unit 152 each correspond to an example of a "second arithmetic device".

In this embodiment, the jobs are assigned to all the servers 1 connected to the switches SW0 to SWE2. However, the second assignment unit 152 does not necessarily have to assign jobs to all the servers 1. Alternatively, the second assignment unit 152 may assign jobs to only some of the servers 1, depending on the number of switches 2 and the number of servers 1 to be used by the individual jobs. If no job is assigned to a server 1, the assignment unacceptable flag of a switch 2 connected to this server 1 may be kept "0" by second assignment unit 152.

Next, the second assignment unit 152 determines a sequence in which the selected servers 1 are to be used by the job B. In this case, the second assignment unit 152 sets the selected servers 1 so as to be used in descending order of global number. More specifically, the second assignment unit 152 allocates rank numbers to the respective servers 1 in such a way that a smaller rank number is given to a server 1 with a larger global number. This makes it possible to determine the sequence in which the servers 1 are to be used by the job B. Since the servers 1 with the global numbers "#1", "#3", and "#5" execute the job B in this embodiment, the second assignment unit 152 determines this sequence in such a way that the servers 1 with the global numbers "#5", "#3", and "#1" are to be used by the job B in this order.

After having determined the above sequence, the second assignment unit 152 creates the host list 141 that indicates the global numbers for the servers 1 that perform the processes in accordance with their rank numbers, and stores the host list 141 in the storage unit 14. For example, the second assignment unit 152 may create a host list 141B as illustrated in FIG. 6. In the host list 141B, the rank number increases upward.

After having created and stored the host list 141, the second assignment unit 152 instructs the servers 1 with the global numbers "#1", "#3", and "#5" to execute the job B so that these servers 1 perform the collective communication operation using the ring algorithm in accordance with the content of the host list 141B. In this way, the second assignment unit 152 assigns the job B to the servers 1 with the global numbers "#1", "#3", and "#5" so that the processes proceed in the direction of the broken line arrow illustrated in FIG. 4.

If the ring algorithm is unusable for the job B, the second assignment unit 152 selects a switch 2 connected to a server 1 to which no jobs are assigned and then assigns a job to the server 1 connected to the selected switch 2. After that, the second assignment unit 152 sets the assignment unacceptable flag of the selected switch 2 to "1".

After the servers 1 have completely executed the job B, the second assignment unit 152 deletes the information on the job B from the assignment management table 140. In addition, the second assignment unit 152 changes the assignment unacceptable flags for the switches 2 connected to the servers 1 that have executed the job B from "1" to "0". In short, the second assignment unit 152 sets the assignment unacceptable flags for the switches SW0 to SW2 to "0".

Assigning the jobs A and B in the above manner causes data for the job A to flow in the direction of the solid line arrow illustrated in FIG. 4 and, in turn, causes data for the job B to flow in the direction of the broken line arrow illustrated in FIG. 4. As a result, the data for the job A and the data for the job B flow between the individual switches 2 in the opposite directions, in which case conflicting links are less likely to be generated on the network illustrated in FIG. 4.

In this embodiment, three switches 2 are disposed on the network; however, four or more switches 2 may be disposed. Even in this case, the job assignment unit 15 only has to assign jobs to the switches 2 in a manner similar to the above.

Figure 7:
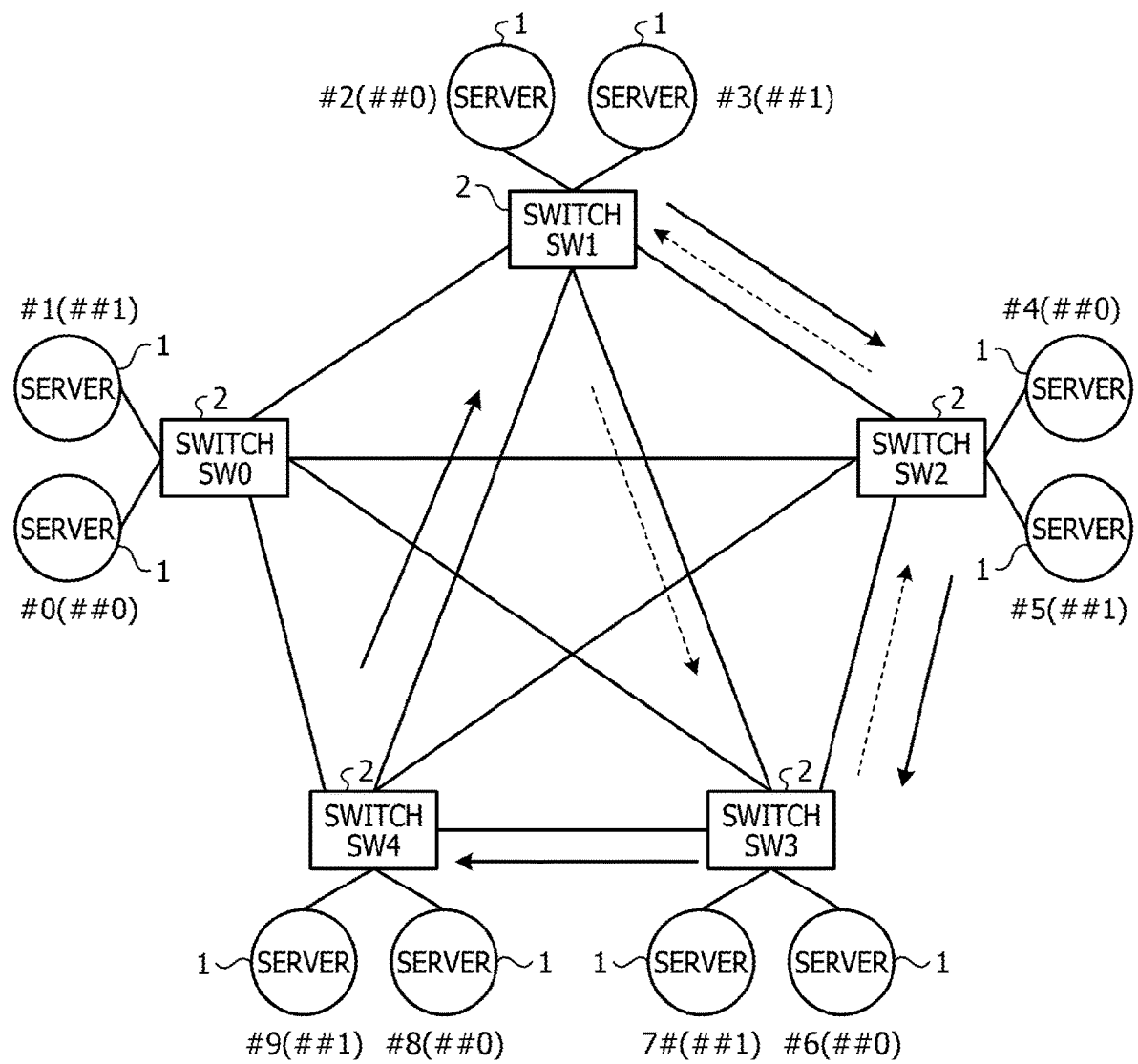
FIG. 7 schematically illustrates another example of the network configuration in which the jobs are assigned to the servers.

In an example illustrated in FIG. 7, five switches 2, each of which is connected to two servers 1, are disposed on a network. FIG. 7 schematically illustrates another example of the network configuration in which the jobs A and B are assigned to the servers 1. Hereinafter, the five switches 2 are denoted by SW0 to SW4. The job A uses four servers 1, whereas the job B uses three servers 1.

The identification number setting unit 12 allocates local numbers "##0" and "##1" to the servers 1 connected to each switch 2. Following this, the identification number setting unit 12 allocates a global number "#0" to the server 1 with the local number "##0" connected to the switch SW0 and allocates a global number "#1" to the server 1 with the local number "##1" connected to the switch SW0. Likewise, the identification number setting unit 12 allocates a global number "#2" to the server 1 with the local number "##0" connected to the switch SW1 and allocates a global number "#3" to the server 1 with the local number "##1" connected to the switch SW1. The identification number setting unit 12 allocates a global number "#4" to the server 1 with the local number "##0" connected to the switch SW2 and allocates a global number "#5" to the server 1 with the local number "##1" connected to the switch SW2. The identification number setting unit 12 allocates a global number "#6" to the server 1 with the local number "##0" connected to the switch SW3 and allocates a global number "#7" to the server 1 with the local number "##1" connected to the switch SW3. The identification number setting unit 12 allocates a global number "#8" to the server 1 with the local number "##0" connected to the switch SW4 and allocates a global number "#9" to the server 1 with the local number "##1" connected to the switch SW4.

The management table creation unit 13 registers the global and local numbers allocated by the identification number setting unit 12 in the assignment management table 140, as illustrated in FIG. 8. FIG. 8 illustrates another example of the assignment management table 140.

The first assignment unit 151 selects, from among the switches 2 with the switch numbers listed in the assignment management table 140, four switches 2 with their assignment unacceptable flags set to "0". In this case, the first assignment unit 151 selects the switches SW1, SW2, SW3, and SW4. Then, the first assignment unit 151 selects one of the servers 1 connected to each of the selected switches 2 and designates the selected servers 1 to execute the job A. In this case, the first assignment unit 151 designates the servers 1 with the global numbers "#2", "#4", "#6", and "#8" to execute the job A.

Figure 9:
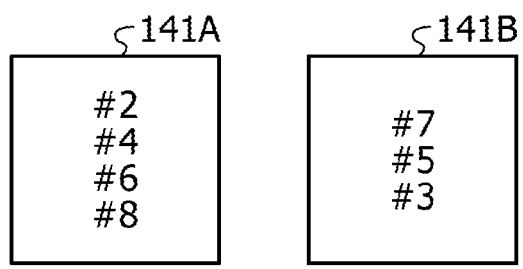
FIG. 9 illustrates an example of the host lists.

The first assignment unit 151 determines a sequence in which the servers 1 are to be used by the job A in such a way that the servers 1 execute the job A in ascending order of global number. Then, the first assignment unit 151 creates the host list 141A illustrated in FIG. 9. FIG. 9 illustrates an example of the host list 141. After that, the first assignment unit 151 instructs the servers 1 with the global number "#2", "#4", "#6", and "#8" to execute the job A in accordance with the content of the host list 141A.

Likewise, the second assignment unit 152 selects, from among the switches 2 with the switch numbers listed in the assignment management table 140, three switches 2 with their assignment unacceptable flags set to "0". In this case, the second assignment unit 152 selects the switches SW1, SW2, and SW3. Then, the second assignment unit 152 selects one of the servers 1 connected to each of the selected switches 2 and designates the selected servers 1 to execute the job B. In this case, the second assignment unit 152 designates the servers 1 with the global numbers "#3", "#5", and "#7" to execute the job B. After that, the second assignment unit 152 searches for switches 2 connected to the servers 1 to which the jobs have been assigned, and then sets the assignment unacceptable flags for the found switches 2 in the assignment management table 140 to "1". In this case, the second assignment unit 152 sets assignment unacceptable flags for the switches SW1 and SW2 to "1".

The second assignment unit 152 determines the sequence in which the servers 1 are to be used by the job B in such a way that the servers 1 execute the job B in descending order of global number. Then, the second assignment unit 152 creates the host list 141B illustrated in FIG. 9. After that, the second assignment unit 152 instructs the servers 1 with the global number "#3", "#5", and "#7" to execute the job B in accordance with the content of the host list 141B.

Assigning the jobs A and B in the above manner causes data for the job A to flow in the direction of the solid line arrow illustrated in FIG. 7 and, in turn, causes data for the job B to flow in the direction of the broken line arrow illustrated in FIG. 7. As a result, the data for the job A and the data for the job B flow between the individual five switches 2 in the opposite directions, in which case conflicting links are less likely to be generated on the network illustrated in FIG. 7.

Figure 10:
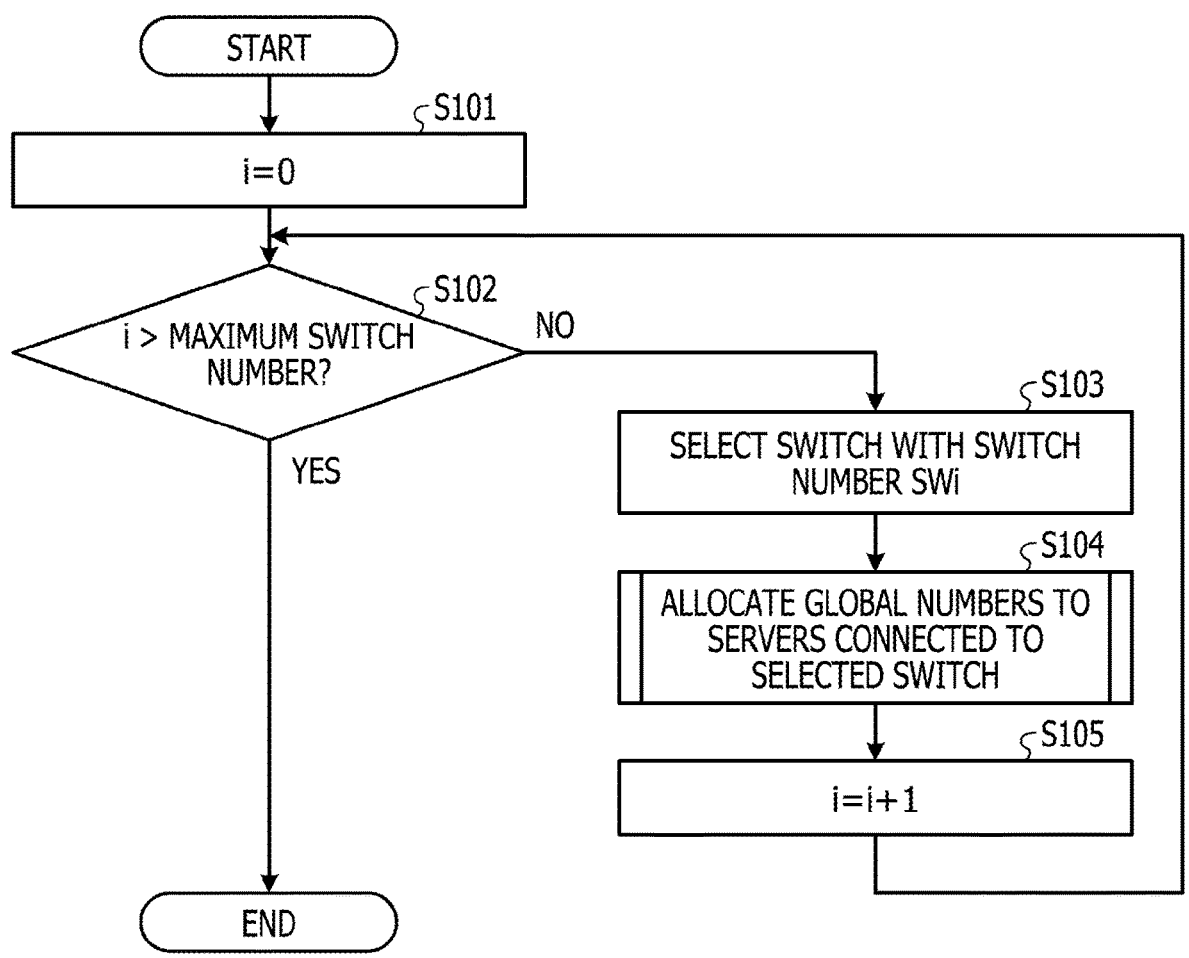
FIG. 10 illustrates a flowchart of a process of assigning global numbers to the servers.

With reference to FIG. 10, next, a description will be given below of a process in which the identification number setting unit 12 allocates global numbers to the respective servers 1. FIG. 10 is a flowchart of this process. In the following description, the switches 2 individually have switch numbers "SW0", "SW1", "SW2", and so on.

At Step S101, the identification number setting unit 12 resets a variable i to "0". This variable i indicates a switch number.

At Step S102, the identification number setting unit 12 determines whether the variable i exceeds a maximum switch number. The expression "the variable i exceeds a maximum switch number" means that the variable i exceeds the maximum of the numbers on the right side of characters "SW" in all the switch numbers. When it is determined that the variable i exceeds the maximum switch number (YES at Step S102), the identification number setting unit 12 terminates this process.

When it is determined that the variable i is equal to or less than the maximum switch number (NO at Step S102), at Step S103, the identification number setting unit 12 selects a switch 2 with a switch number SWi from the switches 2.

At Step S104, the identification number setting unit 12 allocates global numbers to servers 1 connected to the selected switch 2.

At Step S105, the identification number setting unit 12 increments the variable i by one and returns this process to Step S102.

Figure 11:
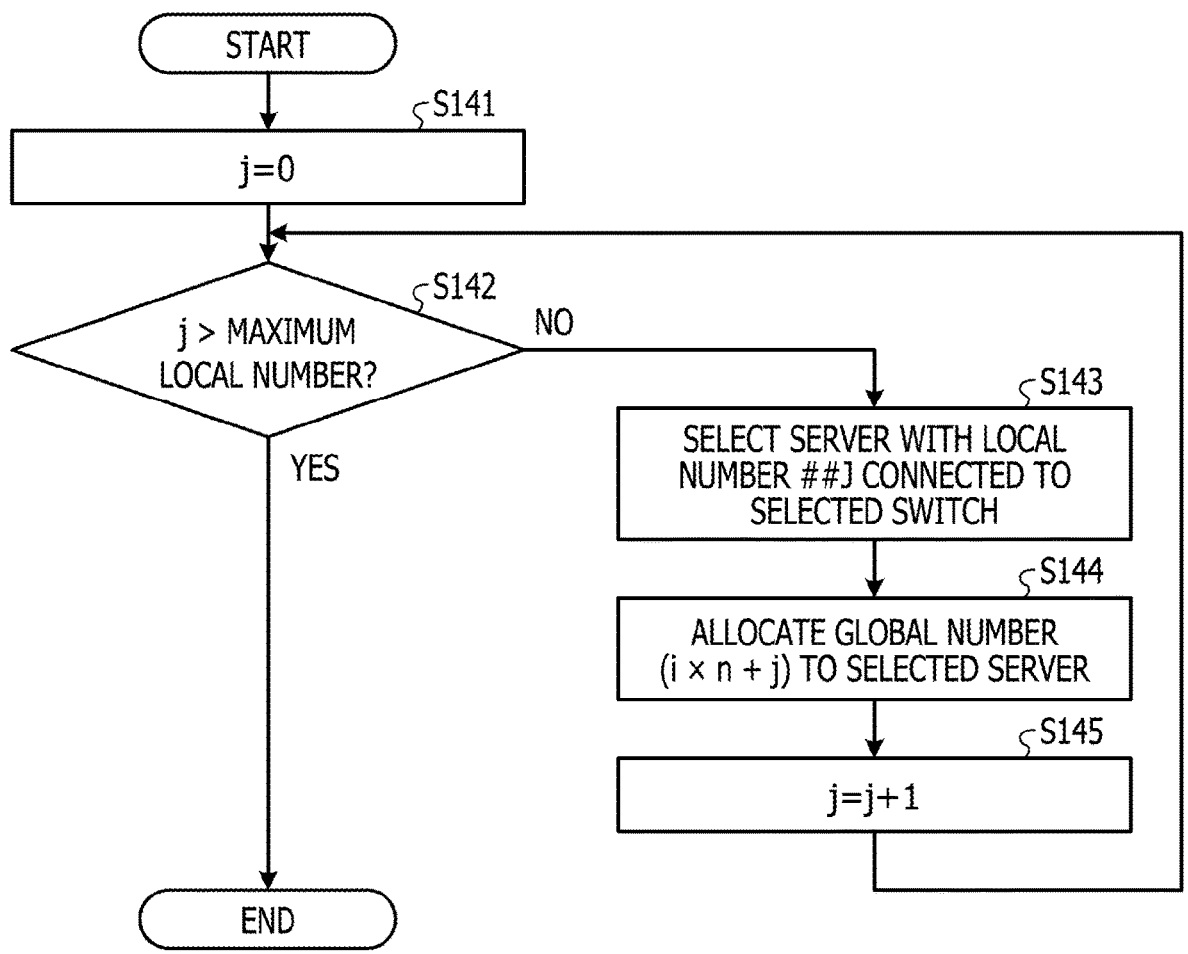
FIG. 11 illustrates a flowchart of a process of assigning global numbers to the servers for each switch.

With reference to FIG. 11, a description will be given below of a process in which the identification number setting unit 12 allocates global numbers to the respective servers 1 for each switch 2. FIG. 11 illustrates a flowchart of a process of assigning global numbers to the servers 1 for each switch 2. The process of the flowchart in FIG. 11 corresponds to an example of Step S104 in FIG. 10. In this case, the identification number setting unit 12 has already allocated the local numbers ##1, ##2, ##3, and so on to the respective servers 1. Furthermore, the description is given regarding a case where the identification number setting unit 12 allocates a global number to a server 1 connected to the switch 2 with the switch number SWn.

At Step S141, the identification number setting unit 12 resets a variable j to "0". The variable j indicates a local number of a server 1.

At Step S142, the identification number setting unit 12 determines whether the variable j exceeds a maximum local number. The expression "the variable j exceeds a maximum local number" means that the variable j exceeds the maximum of the numbers on the right side of characters "##" in all the local numbers of the server 1 connected to a switch 2 with a switch number SWn. When it is determined that the variable j exceeds the maximum local number (YES at Step S142), the identification number setting unit 12 terminates this process.

When it is determined that the variable j is equal to or less than the maximum local number (NO at Step S142), at Step S143, the identification number setting unit 12 selects a server 1 with a local number ##j connected to a selected switch 2.

At Step S144, the identification number setting unit 12 allocates a global number (i×n+j), which is obtained by multiplying the variable i by n and adding j to the product, to the selected server 1.

At Step S145, the identification number setting unit 12 increments the variable j by one and returns to this process to Step S142.

Figure 12:
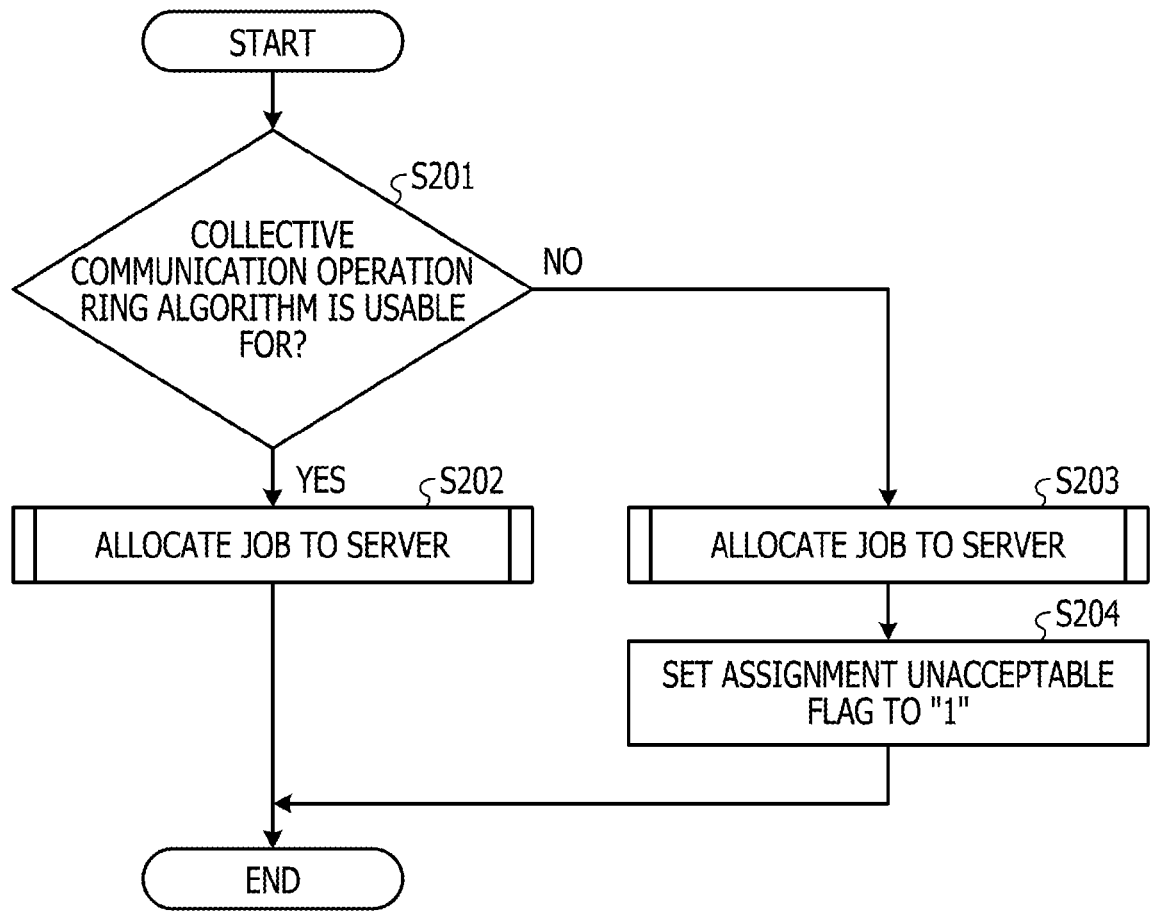
FIG. 12 illustrates a flowchart of an overall job assignment process.

With reference to FIG. 12, a description will be given below of the flow of the overall job assignment process. FIG. 12 illustrates a flowchart of the overall job assignment process. In the following description, the job assignment process is performed by the job assignment unit 15. In fact, the job assignment process may be performed by either one of the first assignment unit 151 and the second assignment unit 152 in the job assignment unit 15.

At Step S201, the job assignment unit 15 determines whether a job given by the operator involves a collective communication operation for which the ring algorithm is usable.

When the given job involves a collective communication operation for which the ring algorithm is usable (YES at Step S201), at Step S202, the job assignment unit 15 allocates the job to a server 1. Then, the job assignment unit 15 terminates the job assignment process.

When the given job does not involve a collective communication operation for which the ring algorithm is usable (YES at Step S201), at Step S203, the job assignment unit 15 allocates the job to a server 1.

At Step S204, the job assignment unit 15 sets the assignment unacceptable flag for the switch 2 connected to the server 1 to which the job has been assigned to "1". Then, the job assignment unit 15 terminates the job assignment process.

Figure 13:
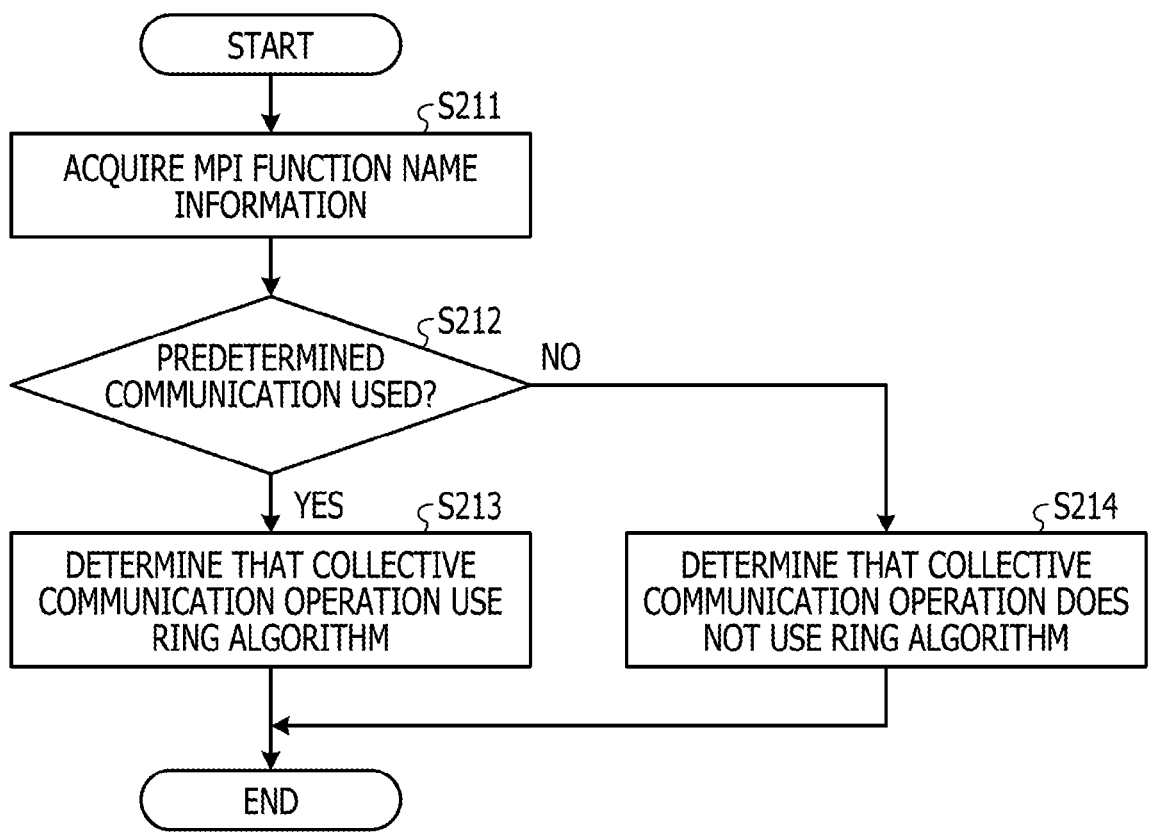
FIG. 13 illustrates a flowchart of a process of determining whether a ring algorithm is usable.

With reference to FIG. 13, a description will be given below of the flow of a process in which the job assignment unit 15 determines whether the ring algorithm is usable. FIG. 13 illustrates the flowchart of the process of determining whether a ring algorithm is usable for a job. The process of the flowchart in FIG. 13 corresponds to an example of Step S201 in FIG. 12.

At Step S211, the job assignment unit 15 acquires the MPI function name information from a program used to execute the job.

Based on the MPI function name information, at Step S212, the job assignment unit 15 determines whether the job involves predetermined communication associated with a collective communication operation using the ring algorithm. For example, this predetermined communication may use the MPI Allgather (v), MPI Allreduce, and MPI Bcast.

When it is determined that the job involves the predetermined communication (YES at Step S212), at Step S213, the job assignment unit 15 determines that the job involves a collective communication operation for which the ring algorithm is usable.

When it is determined that the job involves the predetermined communication (NO at Step S212), at Step S214, the job assignment unit 15 determines that the job involves a collective communication operation for which the ring algorithm is unusable.

Figure 14:
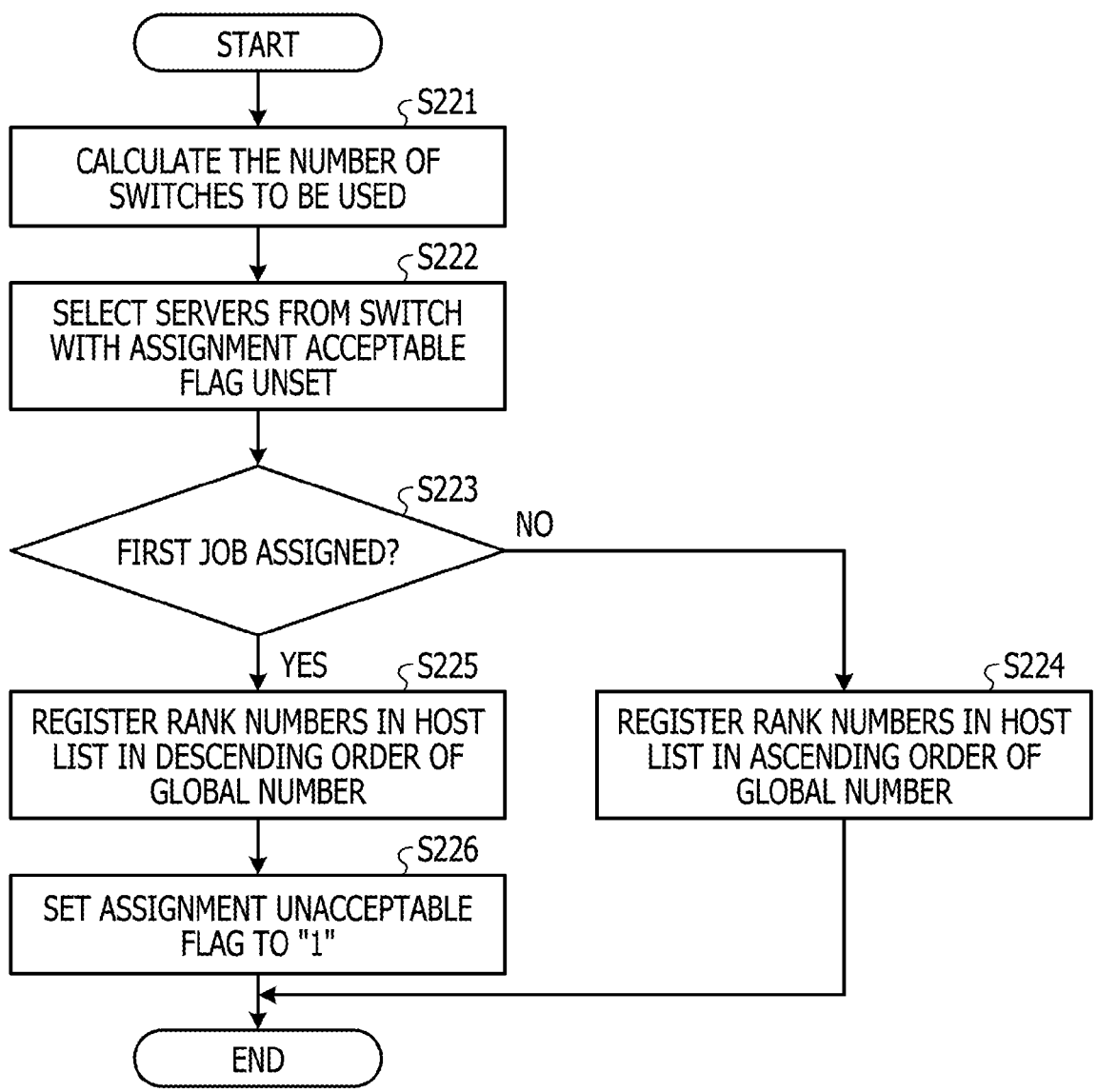
FIG. 14 illustrates a flowchart of a process of assigning jobs to servers.

With reference to FIG. 14, a description will be given below of the flow of a process in which the job assignment unit 15 assigns jobs to servers 1. FIG. 14 illustrates a flowchart of the process of assigning jobs to servers. The process of the flowchart in FIG. 14 corresponds to an example of Step S202 or S203 in FIG. 12. The following description is given regarding a case where two servers 1 are connected to each switch 2.

At Step S221, the job assignment unit 15 calculates the number of switches 2 to be used to execute a job, based on the job information.

At Step S222, the job assignment unit 15 selects, from among the switches 2 with the switch numbers listed in the assignment management table 140, servers 1 with its assignment unacceptable flag set to "0", or unset.

At Step S223, the job assignment unit 15 determines whether a first job is assigned to any of the servers 1.

When the first job is not assigned to both the severs 1 (NO at Step S223), at Step S224, the job assignment unit 15 registers rank numbers of the servers 1 in the host list 141 in ascending order of global number. Then, the job assignment unit 15 terminates the process of assigning the jobs to the servers 1.

When the first job is assigned to one of the severs 1 (YES at Step S223), at Step S225, the job assignment unit 15 registers rank numbers of the servers 1 in the host list 141 in descending order of global number.

At Step S226, the job assignment unit 15 sets the assignment unacceptable flag for the switch 2 in the assignment management table 140 which is connected to the servers 1 to which the jobs are assigned to "1". Then, the job assignment unit 15 terminates the process of assigning the jobs to the servers 1.

Figure 15:
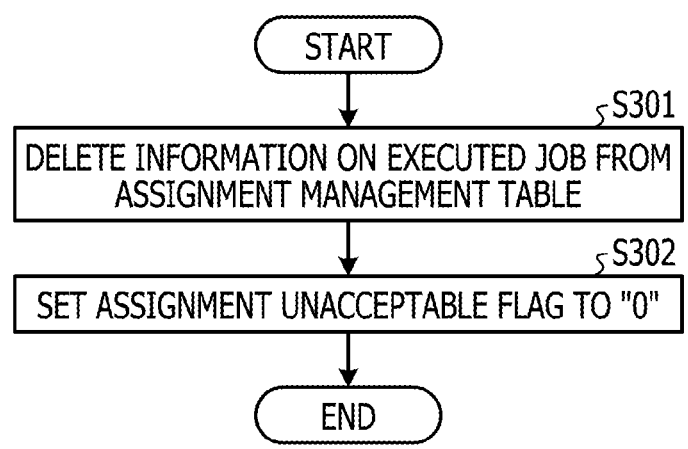
FIG. 15 illustrates a flowchart of a job termination process.

With reference to FIG. 15, a description will be given below of the flow of a process to be performed after the execution of jobs. FIG. 15 illustrates a flowchart of a job termination process.

After a server 1 has executed a job, at Step S301, the job assignment unit 15 deletes the information on this job from the assignment management table 140.

At Step S302, the job assignment unit 15 sets the assignment unacceptable flag for the switch 2 connected to the server 1 to "0".

In the above way, a management apparatus in one embodiment uniquely allocates global numbers to respective servers connected to switches. If assigning first and second jobs that use ring algorithms to the same switches, the management apparatus sequentially forwards data for the first job from one server with a smaller global number to another server with a larger global number and, in turn, forwards data for the second job from one server with a larger global number to another server with a smaller global number. Consequently, the management apparatus successfully suppresses a conflicting link from being generated on a network employing the full mesh topology, thereby controlling lowering of system performance. Furthermore, the management apparatus successfully suppresses a large number of servers from being unused, thereby providing higher system usage efficiency. Moreover, by reducing the risk of generation of a conflicting link, the management apparatus enables an execution time for a job to be estimated more accurately.

Embodiment 2

Figure 16:
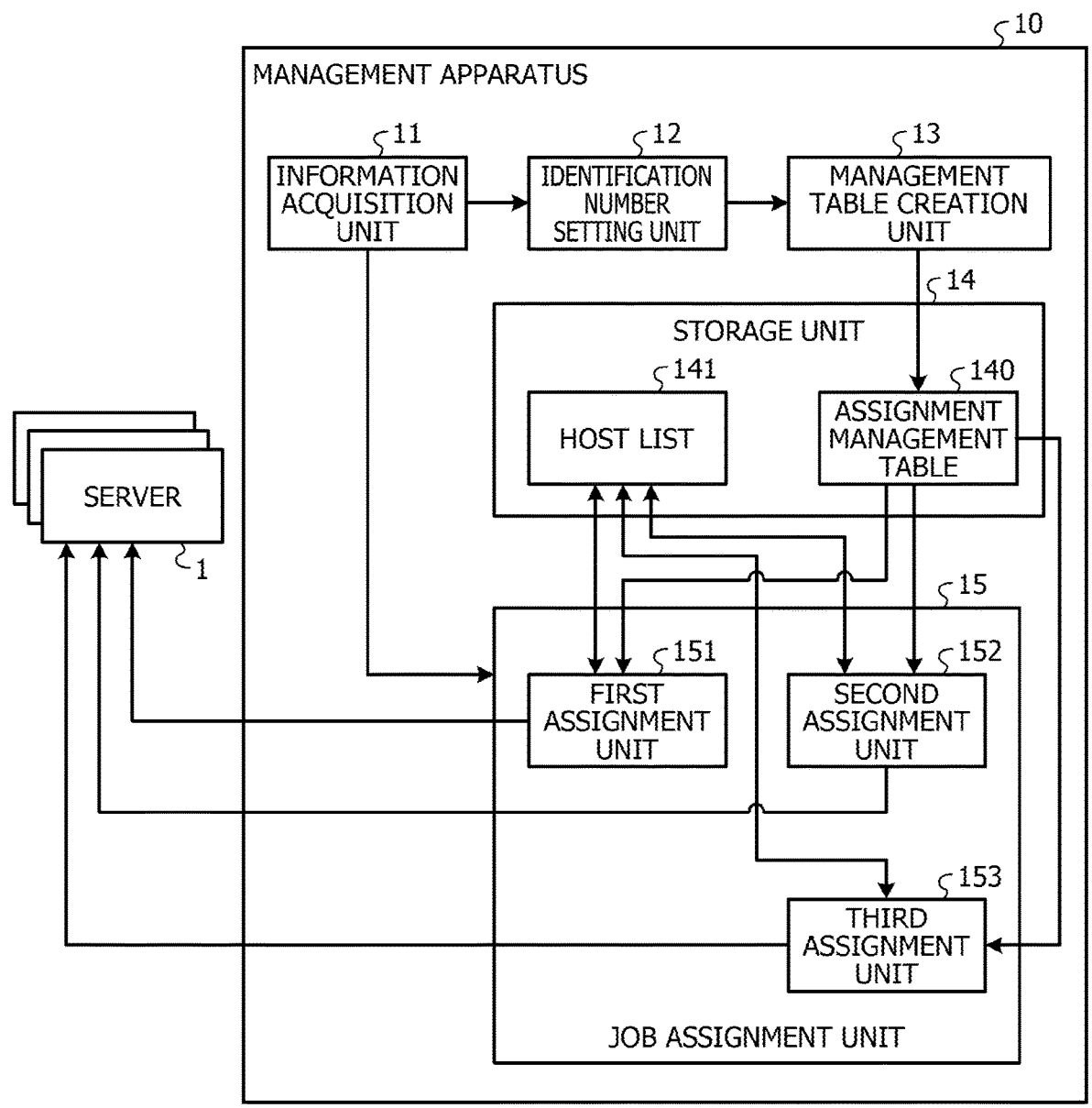
FIG. 16 is a block diagram of a management apparatus in Embodiment 2.

FIG. 16 is a block diagram of a management apparatus 10 in Embodiment 2. In this embodiment, the management apparatus 10 assigns three jobs to servers 1. The management apparatus 10 includes a job assignment unit 15, which includes a first assignment unit 151, a second assignment unit 152, and a third assignment unit 153. It is to be noted that, of the constituent elements in FIG. 16, ones whose reference numerals are identical to those of the constituent elements in FIG. 3 have substantially the same functions as those of the constituent elements in FIG. 3 unless otherwise specified.

Figure 17:
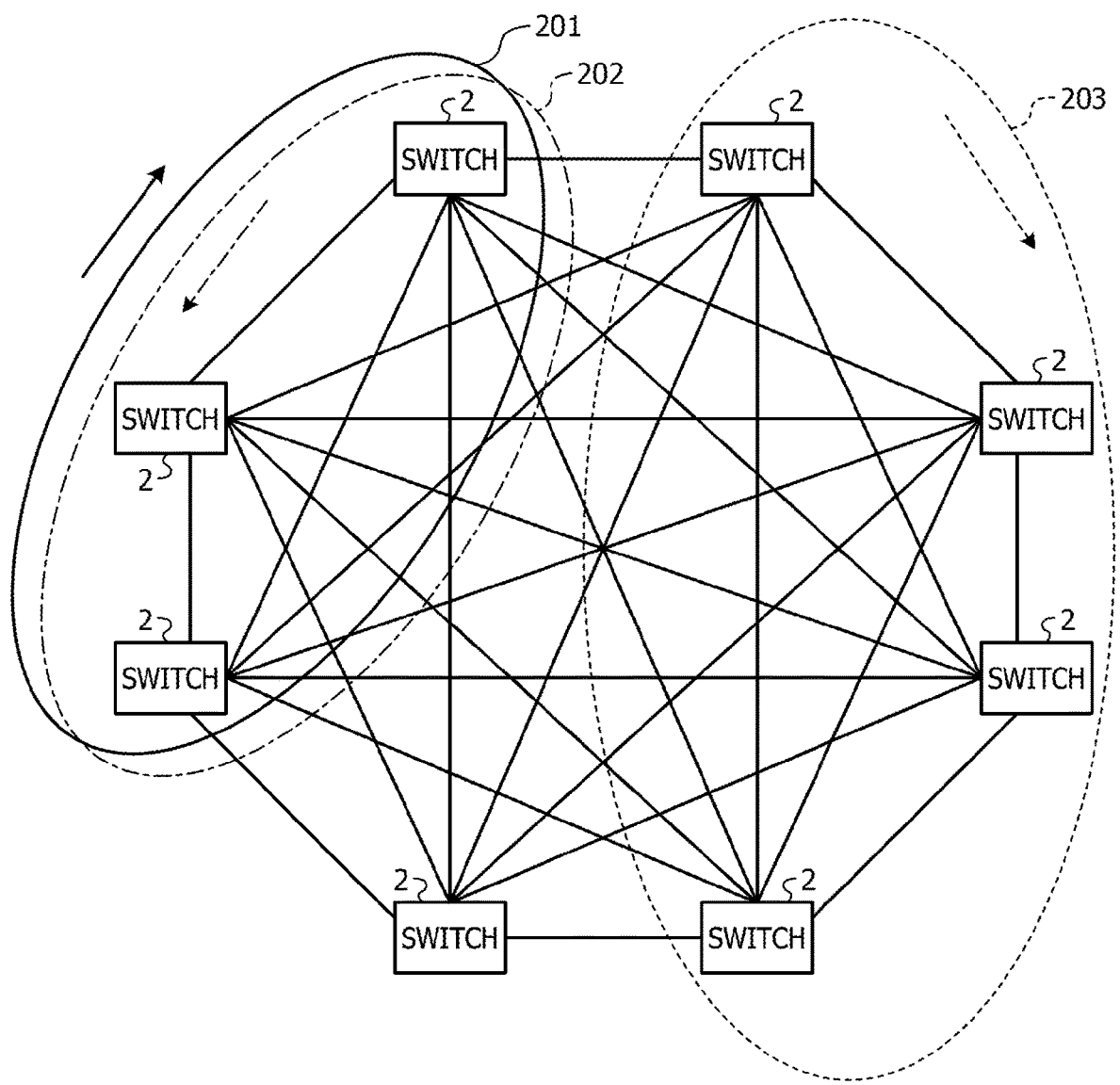
FIG. 17 illustrates an example of a state in which three jobs are assigned to servers.

To assign three jobs to the servers 1 as illustrated in FIG. 17, the first assignment unit 151, the second assignment unit 152, and the third assignment unit 153 perform processes that will be described below. FIG. 17 illustrates an example of a state in which the three jobs are assigned to the servers 1.

For example, the first assignment unit 151 selects the three switches 2 contained in a first job assignment region 201 to assign a first job. Then, the first assignment unit 151 assigns the first job to the servers 1 connected to the selected switches 2 in such a way that these servers 1 sequentially perform processes for the first job in ascending order of global number. As a result, data for the first job flows in the direction of the solid line arrow in FIG. 17.

The second assignment unit 152 selects the three switches 2 contained in a second job assignment region 202 to assign a second job. In this case, the second job assignment region 202 overlaps the first job assignment region 201. Then, the second assignment unit 152 assigns the second job to the servers 1 connected to the selected switches 2 in such a way that these servers 1 sequentially perform processes for the second job in descending order of global number. As a result, data for the second job flows in the direction of the alternate long and short dash line arrow in FIG. 17.

The third assignment unit 153 selects the four switches 2 contained in a third job assignment region 203 to assign a third job. In this case, the third job assignment region 203 overlaps neither the first job assignment region 201 nor the second job assignment region 202. The switches 2 selected by the third assignment unit 153 correspond to an example of a "third arithmetic device". Then, the third assignment unit 153 assigns the third job to the servers 1 connected to the selected switches 2 in such a way that these servers 1 sequentially perform processes for the third job in ascending order of global number. As a result, data for the third job flows in the direction of the broken line arrow in FIG. 17.

In FIG. 17, the direction of the above solid line arrow is opposite to that of the above alternate long and short dash line arrow. More specifically, the flow direction of the data for the first job is opposite to that of the data for the second job. In which case, no conflicting links may be generated in the first job assignment region 201 and the second job assignment region 202. Furthermore, the data for the third job flows along a different path from the paths of the data for the first and second jobs. In which case, no conflicting links may be generated in the third job assignment region 203.

In the above way, the management apparatus 10 successfully assigns three jobs to the servers 1 with a minimal risk of generating a conflicting link.

(Modification)

Figure 18:
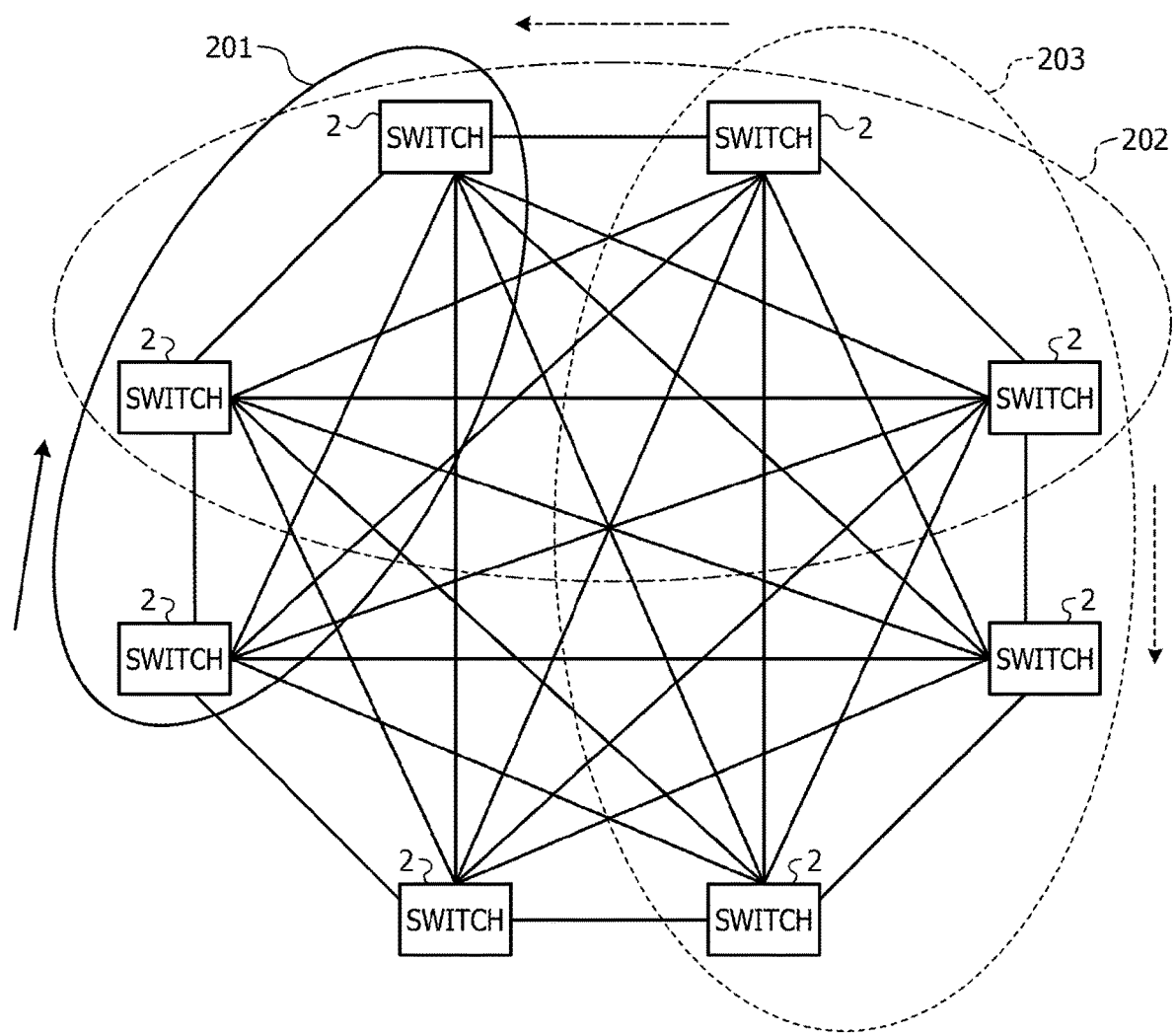
FIG. 18 illustrates another example of the state in which the three jobs are assigned to the servers.

In foregoing Embodiment 2, one job assignment region overlaps another job assignment region. However, one job assignment region may overlap two or more other job assignment regions separately. FIG. 18 illustrates another example of the state in which the three jobs are assigned to the servers 1.

For example, the first assignment unit 151 selects the three switches 2 contained in a first job assignment region 201 to assign a first job. Then, the first assignment unit 151 assigns the first job to the servers 1 connected to the selected switches 2 in such a way that these servers 1 sequentially perform processes in ascending order of global number. As a result, data for the first job flows in the direction of the solid line arrow in FIG. 18.

The second assignment unit 152 selects the four switches 2 contained in a second job assignment region 202 to assign a second job. In this case, the second job assignment region 202 overlaps the first job assignment region 201. Then, the second assignment unit 152 assigns the second job to the servers 1 connected to the selected switches 2 in such a way that these servers 1 sequentially perform processes in descending order of global number. As a result, data for the second job flows in the direction of the alternate long and short dash line arrow in FIG. 18.

The third assignment unit 153 selects the four switches 2 contained in a third job assignment region 203 to assign a third job. In this case, the third job assignment region 203 does not overlap the first job assignment region 201 but overlaps the second job assignment region 202. Then, the third assignment unit 153 assigns the third job to the servers 1 connected to the selected switches 2 in such a way that these servers 1 sequentially perform processes in ascending order of global number. As a result, data for the third job flows in the direction of the broken line arrow in FIG. 18.

In FIG. 18, the direction of the above solid line arrow is opposite to that of the above alternate long and short dash line arrow. More specifically, the flow direction of the data for the first job is opposite to that of the data for the second job. In which case, no conflicting links may be generated in the first job assignment region 201 and the second job assignment region 202. Likewise, the direction of the alternate long and short dash line arrow is opposite to that of the above broken line arrow. More specifically, the flow direction of the data for the second job is opposite to that of the data for the third job. In which case, no conflicting links may be generated in the second job assignment region 202 and the third job assignment region 203.

In the above way, the management apparatus 10 successfully assigns three or more jobs to the servers 1 with a minimal risk of generating a conflicting link. In short, when assigning jobs to the servers 1, the management apparatus 10 selects the switches 2 in such a way that each switch 2 does not share three or more jobs and that the switches 2 connected to one of the selected switches perform a process in ascending order of global number whereas the switches 2 connected to another one of the selected switches perform a process in descending order of global number. This makes it possible to reduce the risk of generation of a conflicting link.

Figure 19:
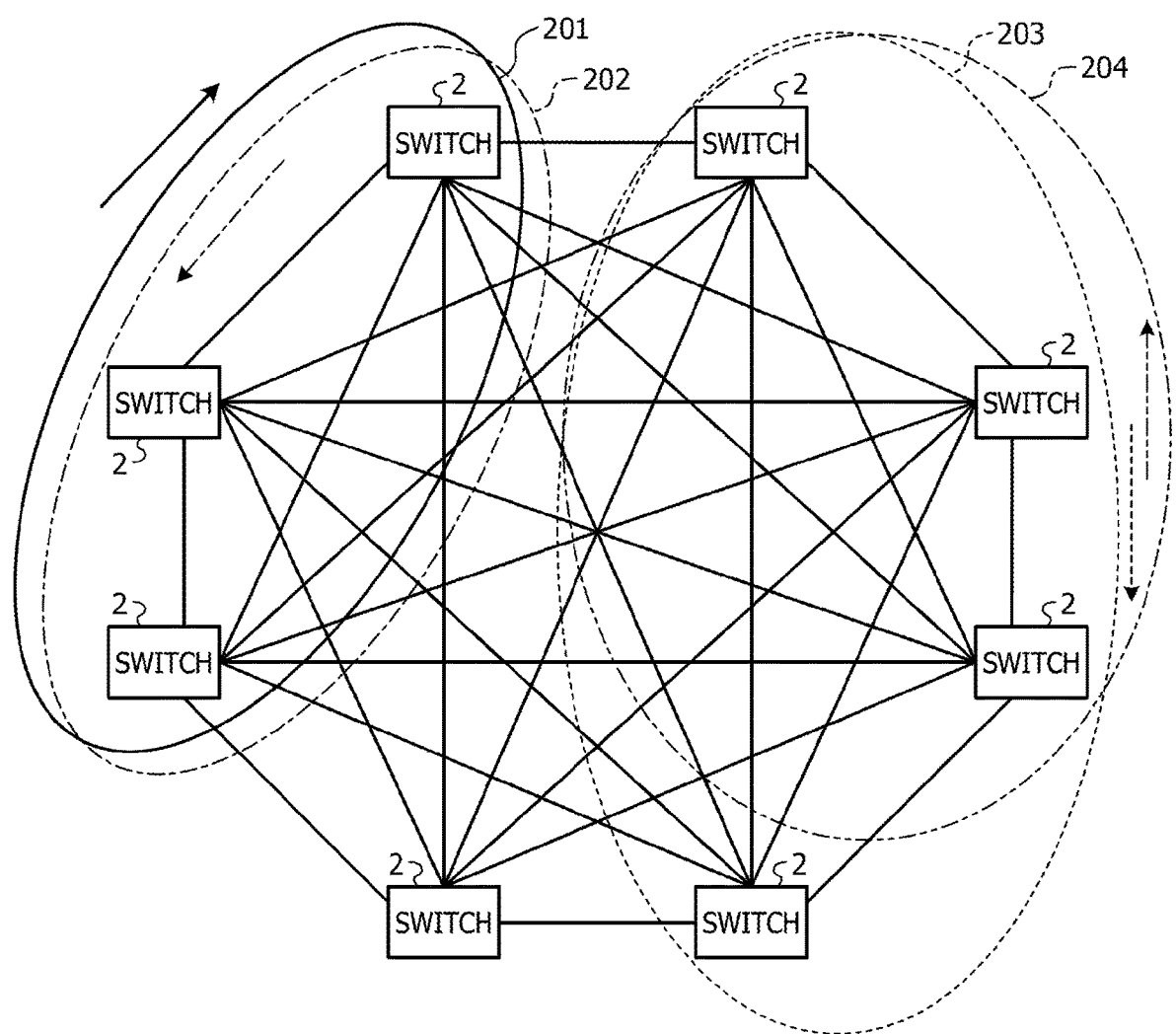
FIG. 19 illustrates an example of a state in which four jobs are assigned to the servers.

Although the management apparatus 10 assigns three jobs to the servers 1 in Example 2, the management apparatus 10 may also assign four or more jobs in a manner similar to the above. As an example, a description will be given below regarding a case where the management apparatus 10 assigns four jobs to the servers 1. FIG. 19 illustrates an example of a state in which four jobs are assigned to the servers 1. In the management apparatus 10, the job assignment unit 15 includes an unillustrated fourth assignment unit in addition to the above first assignment unit 151, second assignment unit 152, and third assignment unit 153. In this case, the first assignment unit 151, the second assignment unit 152, and the third assignment unit 153 assign the first to third jobs, respectively, to the servers 1 in a manner similar to that in the above case where the above first to third jobs are assigned.

The fourth assignment unit in the job assignment unit 15 selects the three switches 2 contained in a fourth job assignment region 204 to assign a fourth job. The fourth job assignment region 204 overlaps neither the first job assignment region 201 nor the second job assignment region 202 but overlaps the third job assignment region 203. Then, the fourth assignment unit assigns the fourth job to servers 1 connected to the selected switches 2 in such a way that these servers 1 sequentially perform processes in descending order of global number. As a result, data for the fourth job flows in the direction of the alternate long and two short dashes line arrow in FIG. 19.

In FIG. 19, the direction of the above solid line arrow is opposite to that of the above alternate long and short dash line arrow. More specifically, the flow direction of the data for the first job is opposite to that of the data for the second job. In which case, no conflicting links may be generated in the first job assignment region 201 and the second job assignment region 202. Likewise, the direction of the above broken line arrow is opposite to that of the above alternate long and two short dashes line arrow. More specifically, the flow direction of the data for the third job is opposite to that of the data for the fourth job. In which case, no conflicting links may be generated in the third job assignment region 203 and the fourth job assignment region 204. Moreover, since the data for the third and fourth jobs does not flow along the paths of the data for the first and second jobs, no conflicting links may be generated in the first job assignment region 201 to the fourth job assignment region 204.

In the above way, the management apparatus 10 successfully assigns four jobs to the servers 1 with a minimal risk of generating a conflicting link.

Embodiment 3

Next, Embodiment 3 will be described below. In this embodiment, a management apparatus 10 assigns jobs to servers 1 disposed on a network. In this case, each job involves a collective communication operation using a ring algorithm; the network employs a multilayer full mesh topology.

Figure 20:
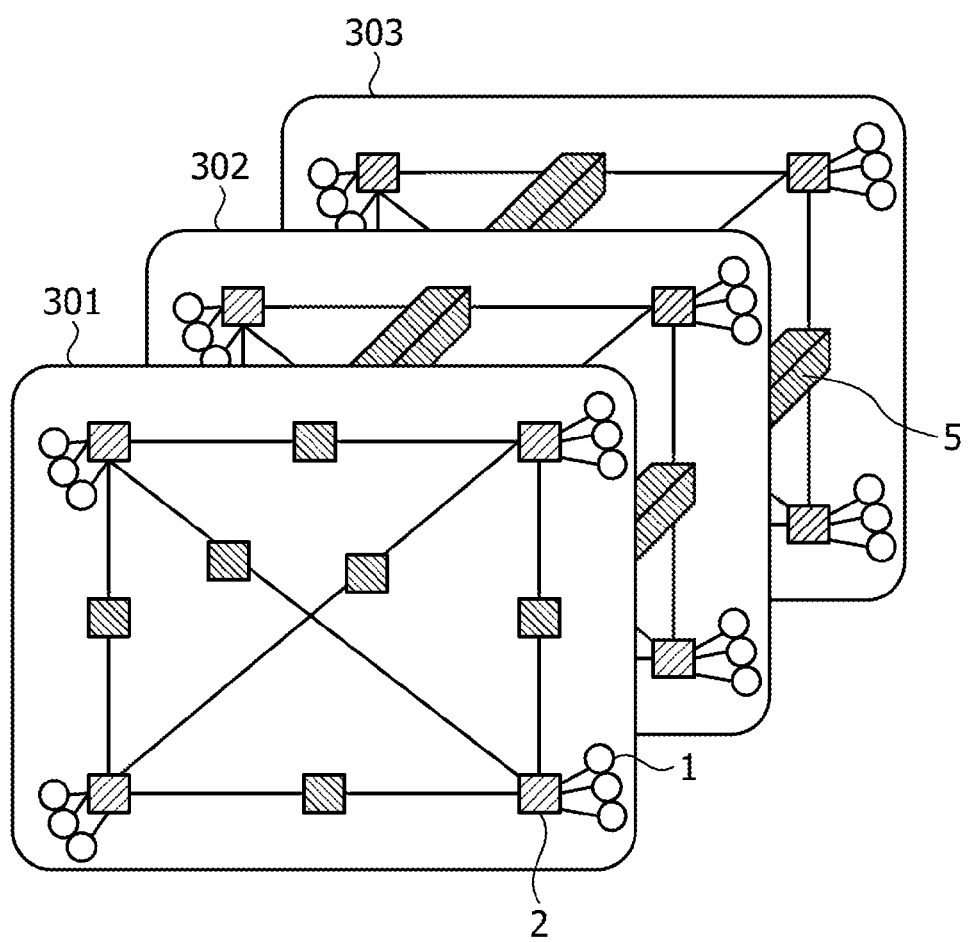
FIG. 20 conceptually illustrates a multilayer full mesh topology structure.

FIG. 20 conceptually illustrates a multilayer full mesh topology structure. This multilayer full mesh topology structure is formed by stacking networks 301 to 303, each of which employs the full mesh topology.

The networks 301 to 303 constitute the multilayer full mesh topology structure and each employ the full mesh topology. Each of the networks 301 to 303 includes switches 2. Each switch 2 may also be referred to as the leaf switch. The network 301 is connected to the network 302 via a switch 5; the network 302 is connected to the network 303 via another switch 5. Each switch 5 may also be referred to as the spine switch.

In the above example, a management apparatus 10 assigns jobs to servers 1 on each of the networks 301 to 303. In this case, the management apparatus 10 assigns the jobs in a manner similar to that in above Embodiment 1 and Embodiment 2. As a result, even if pieces of data for different jobs flow along the same path, these flow directions are opposite to each other.

In the above manner, the management apparatus 10 in Embodiment 3 successfully reduces the risk of generation of a conflicting link on a network employing the multilayer full mesh topology.

As described above, a management apparatus 10 in one embodiment assigns first and second jobs to servers in such a way that the servers sequentially perform processes for the first job in ascending order of global number and, in turn, sequentially perform processes for the second job in descending order of global number. However, the management apparatus 10 only has to assign first and second jobs to servers in such a way that the processes for the first and second jobs are performed in opposite orders. As an alternative example, the management apparatus 10 assigns first and second jobs to servers 1 in such a way that the processes for the first job are performed in the descending order and, in turn, the processes for the second job are performed in the ascending order.

(Hardware Configuration)

Figure 21:
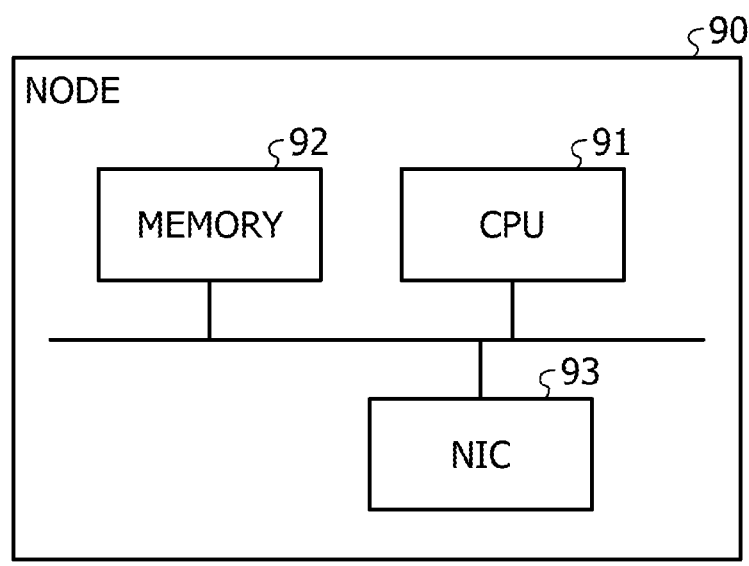
FIG. 21 illustrates a hardware configuration of a node.

FIG. 21 illustrates a hardware configuration of a node 90. For example, the node 90 may implement a server 1 and a management apparatus 10.

The node 90 includes a central processing unit (CPU) 91, a memory 92, and a network interface card (NIC) 93. If the management apparatus 10 is implemented by the node 90, the NIC 93 serves as a communication interface with the server 1.

The memory 92 realizes the function of the storage unit 14 illustrated in FIG. 3 or 16. In addition, the memory 92 stores various programs, including a program for use in realizing the functions of the information acquisition unit 11, the identification number setting unit 12, the management table creation unit 13, and the job assignment unit 15 illustrated in FIG. 3 or 16.

The CPU 91 reads any given program from the memory 92, expands the program in the memory 92, and executes the program. In this way, the CPU 91 realizes the functions of the information acquisition unit 11, the identification number setting unit 12, the management table creation unit 13, and the job assignment unit 15 illustrated in FIG. 3 or 16.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A job assignment apparatus comprising:
a memory; and
a processor coupled to the memory and the processor configured to:
determine whether a first job is allocated to at least one arithmetic devices among a plurality of arithmetic devices which connects to a switch,
when the first job is not allocated to the at least one arithmetic devices, perform assignment of the first job to a first arithmetic device and a second arithmetic device among the plurality of arithmetic devices in such a way that data is transmitted in a first direction, the first job being processed in a process algorithm in which a plurality of arithmetic devices sequentially transmit data, the first arithmetic device being connected to the second arithmetic device via a first switch and a second switch, the first direction being a direction from the first switch to the second switch, and
when the first job is allocated to the at least one arithmetic devices, perform assignment of a second job which is assigned after the first job to a third arithmetic device and a fourth arithmetic device among the plurality of arithmetic devices in such a way that data is transmitted in a second direction, the second job being processed in the process algorithm, the third arithmetic device being connected to the fourth arithmetic device via the first switch and the second switch, the second direction being a direction from the second switch to the first switch.

2. The job assignment apparatus according to claim 1, wherein the process algorithm is a ring algorithm.

3. The job assignment apparatus according to claim 1, wherein the first switch and the second switch are disposed on a network employing a full mesh topology in which a plurality of switches are interconnected via full duplex communication paths.

4. The job assignment apparatus according to claim 1, wherein the assignment of the second job includes detect whether another job that uses the first switch and the second switch has been already assigned, and when it is detected that the first job has been assigned as the other job, specifying the first direction in which the data for the first job is transmitted.

5. The job assignment apparatus according to claim 1, wherein
the first arithmetic device is coupled directly to the first switch, the second arithmetic device is coupled directly to the second switch, the third arithmetic device is coupled directly to the first switch, and the fourth arithmetic device is coupled directly to the second switch, the assignment of the first job includes generating a command that causes the first arithmetic device and the second arithmetic device to sequentially perform processes for the first job in an order from the first arithmetic device to the second arithmetic device, and the assignment of the second job includes generating another command that causes the third arithmetic device and the fourth arithmetic device to sequentially perform processes for the second job in an order from the fourth arithmetic device to the third arithmetic device.

6. The job assignment apparatus according to claim 1, wherein the processor is further configured to perform assignment of the first job to the second arithmetic device and a fifth arithmetic device in such a way that the data is transmitted in a third direction from the second switch to a third switch, the second arithmetic device being coupled to the fifth arithmetic device via the second switch and the third switch, and perform assignment of a third job to a sixth arithmetic device and a seventh arithmetic device in such a way that data is transmitted in a fourth direction from the third switch to the second switch, the third job being processed in the process algorithm, the sixth arithmetic device being coupled to the seventh arithmetic device via the second switch and the third switch.

7. The job assignment apparatus according to claim 1, wherein the assignment of the first job includes selecting the first switch and the second switch to be used as a communication path for the first job, selecting the first arithmetic device from among a plurality of arithmetic devices coupled to the selected first switch, and selecting the second arithmetic device from among a plurality of arithmetic devices coupled to the selected second switch, and the assignment of the second job includes selecting the first switch and the second switch to be used as a communication path for the second job, selecting the third arithmetic device from among the plurality of arithmetic devices coupled to the selected first switch except a arithmetic device selected for the first job, and selecting the fourth arithmetic device from among the plurality of arithmetic devices connected to the selected second switch except a arithmetic device selected for the first job.

8. A computer-implemented job assignment method comprising:

determining whether a first job is allocated to at least one arithmetic device among a plurality of arithmetic devices which connects to a switch, when the first job is not allocated to the at least one arithmetic devices, performing assignment of the first job to a first arithmetic device and a second arithmetic device among the plurality of arithmetic devices in such a way that data is transmitted in a first direction, the first job being processed in a process algorithm in which a plurality of arithmetic devices sequentially transmit data, the first arithmetic device being connected to the second arithmetic device via a first switch and a second switch, the first direction being a direction from the first switch to the second switch, and when the first job is allocated to the at least one arithmetic devices, performing assignment of a second job which is assigned after the first job to a third arithmetic device and a fourth arithmetic device among the plurality of arithmetic devices in such a way that data is transmitted in a second direction, the second job being processed in the process algorithm, the third arithmetic device being connected to the fourth arithmetic device via the first switch and the second switch, the second direction being a direction from the second switch to the first switch.

9. The job assignment method according to claim 8, wherein the process algorithm is a ring algorithm.

10. The job assignment method according to claim 8, wherein the first switch and the second switch are disposed on a network employing a full mesh topology in which a plurality of switches are interconnected via full duplex communication paths.

11. The job assignment method according to claim 8, wherein the assignment of the second job includes detect whether another job that uses the first switch and the second switch has been already assigned, and when it is detected that the first job has been assigned as the other job, specifying the first direction in which the data for the first job is transmitted.

12. The job assignment apparatus according to claim 8, wherein the first arithmetic device is coupled directly to the first switch, the second arithmetic device is coupled directly to the second switch, the third arithmetic device is coupled directly to the first switch, and the fourth arithmetic device is coupled directly to the second switch, the assignment of the first job includes generating a command that causes the first arithmetic device and the second arithmetic device to sequentially perform processes for the first job in an order from the first arithmetic device to the second arithmetic device, and the assignment of the second job includes generating another command that causes the third arithmetic device and the fourth arithmetic device to sequentially perform processes for the second job in an order from the fourth arithmetic device to the third arithmetic device.

13. The job assignment method according to claim 9, further comprising:

perform assignment of the first job to the second arithmetic device and a fifth arithmetic device in such a way that the data is transmitted in a third direction from the second switch to a third switch, the second arithmetic device being coupled to the fifth arithmetic device via the second switch and the third switch, and perform assignment of a third job to a sixth arithmetic device and a seventh arithmetic device in such a way that data is transmitted in a fourth direction from the third switch to the second switch, the third job being processed in the process algorithm, the sixth arithmetic device being coupled to the seventh arithmetic device via the second switch and the third switch.

14. The job assignment method according to claim 8, wherein the assignment of the first job includes selecting the first switch and the second switch to be used as a communication path for the first job, selecting the first arithmetic device from among a plurality of arithmetic devices coupled to the selected first switch, and selecting the second arithmetic device from among a plurality of arithmetic devices coupled to the selected second switch, and the assignment of the second job includes
- selecting the first switch and the second switch to be used as a communication path for the second job,
- selecting the third arithmetic device from among the plurality of arithmetic devices coupled to the selected first switch except a arithmetic device selected for the first job, and
- selecting the fourth arithmetic device from among the plurality of arithmetic devices connected to the selected second switch except a arithmetic device selected for the first job.

\* \* \* \* \*